US008287757B2

(12) United States Patent
Agrawal et al.

(10) Patent No.: US 8,287,757 B2
(45) Date of Patent: *Oct. 16, 2012

(54) HIGH-INTENSITY, PERSISTENT PHOTOLUMINESCENT FORMULATIONS AND OBJECTS, AND METHODS FOR CREATING THE SAME

(75) Inventors: Satish Agrawal, Concord, MA (US); Edward Kingsley, Stow, MA (US)

(73) Assignee: Performance Indicator, LLC, Lowell, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/115,843

(22) Filed: Aug. 3, 2011

(65) Prior Publication Data
US 2012/0028054 A1 Feb. 2, 2012

Related U.S. Application Data

(62) Division of application No. 11/793,376, filed as application No. PCT/US2005/046039 on Dec. 20, 2005.

(60) Provisional application No. 60/637,535, filed on Dec. 20, 2004.

(51) Int. Cl.
C09K 11/02 (2006.01)
B32B 33/00 (2006.01)

(52) U.S. Cl. ......... 252/301.33; 252/301.36; 252/301.35; 106/31.64; 106/31.32

(58) Field of Classification Search ............. 252/301.33, 252/301.36, 301.35; 106/31.64, 31.32
See application file for complete search history.

(56) References Cited

U.S. PATENT DOCUMENTS

| | | | |
|---|---|---|---|
| 2,522,704 A | 9/1950 | Laval |
| 2,527,365 A | 10/1950 | Leverenz |
| 2,787,558 A | 4/1957 | Wadely |
| 3,022,189 A | 2/1962 | Malmquist |
| 3,212,898 A | 10/1965 | Gerreta |
| 3,508,810 A | 4/1970 | Baltzer |
| 3,522,143 A | 7/1970 | Motter |
| 3,560,211 A | 2/1971 | Fotland |
| 3,562,172 A | 2/1971 | Ono |
| 3,578,602 A | 5/1971 | Ono |
| 3,595,804 A | 7/1971 | Martin |
| 3,627,690 A | 12/1971 | Casella |
| 3,650,812 A | 3/1972 | Nordstrom et al. |
| 3,654,190 A | 4/1972 | Levine |
| 3,666,352 A | 5/1972 | Wagner et al. |
| 3,668,189 A | 6/1972 | Goetz |

(Continued)

FOREIGN PATENT DOCUMENTS
EP 0159678 A1 10/1985
(Continued)

OTHER PUBLICATIONS

Extended European Search Report for EP07873754 dated Mar. 24, 2011.

(Continued)

Primary Examiner — Carol M Koslow
(74) Attorney, Agent, or Firm — Elissa M. Kingsland

(57) ABSTRACT

Disclosed are photoluminescent formulations, comprising an effective amount of photoluminescent phosphorescent materials, which exhibit high luminous intensity and persistence. Also disclosed are photoluminescent objects formed by applying at least one photoluminescent layer, formed from photoluminescent formulations, to preformed articles. Further disclosed are methods for creating photoluminescent objects.

8 Claims, 13 Drawing Sheets

U.S. PATENT DOCUMENTS

| | | | |
|---|---|---|---|
| 3,714,181 A | 1/1973 | Lantos |
| 3,738,299 A | 6/1973 | Packler et al. |
| 3,873,390 A | 3/1975 | Cornell et al. |
| 3,884,697 A | 5/1975 | Inove et al. |
| 3,912,677 A | 10/1975 | Baker et al. |
| 3,924,027 A | 12/1975 | Saito |
| 3,936,970 A | 2/1976 | Hodges |
| 3,957,678 A | 5/1976 | Dikhoff et al. |
| 3,980,602 A | 9/1976 | Jakubauskas |
| 4,025,661 A | 5/1977 | Moscony |
| 4,028,118 A | 6/1977 | Nakasuji et al. |
| 4,105,583 A | 8/1978 | Glover et al. |
| 4,121,011 A | 10/1978 | Glover et al. |
| 4,130,760 A | 12/1978 | Fanselow et al. |
| 4,188,449 A | 2/1980 | Lu et al. |
| 4,208,300 A | 6/1980 | Gravisse |
| 4,210,953 A | 7/1980 | Stone |
| 4,211,813 A | 7/1980 | Gravisse et al. |
| 4,215,010 A | 7/1980 | Hovey et al. |
| 4,268,134 A | 5/1981 | Gulati et al. |
| 4,286,957 A | 9/1981 | Le Naour-Sene |
| 4,287,229 A | 9/1981 | Watanabe et al. |
| 4,289,497 A | 9/1981 | Hovey |
| 4,304,833 A | 12/1981 | Foley |
| 4,342,668 A | 8/1982 | Hovey et al. |
| 4,362,799 A | 12/1982 | Kondo et al. |
| 4,375,373 A | 3/1983 | Abe et al. |
| 4,379,100 A | 4/1983 | Salisbury et al. |
| 4,421,560 A | 12/1983 | Kito et al. |
| 4,425,161 A | 1/1984 | Shibahashi et al. |
| 4,425,377 A | 1/1984 | Deal et al. |
| 4,440,672 A | 4/1984 | Chu |
| 4,451,504 A | 5/1984 | Gallaro et al. |
| 4,567,019 A | 1/1986 | Lawton |
| 4,602,263 A | 7/1986 | Borror et al. |
| 4,617,468 A | 10/1986 | Shiraishi et al. |
| 4,623,579 A | 11/1986 | Quon |
| 4,629,583 A | 12/1986 | Goguen |
| 4,637,698 A | 1/1987 | Kwak et al. |
| 4,640,797 A | 2/1987 | Goguen |
| 4,663,214 A | 5/1987 | Coburn, Jr. |
| 4,681,791 A | 7/1987 | Shibahashi et al. |
| 4,695,336 A | 9/1987 | Coburn, Jr. |
| 4,698,296 A | 10/1987 | Lewis |
| 4,699,473 A | 10/1987 | Chu |
| 4,717,710 A | 1/1988 | Shimizu et al. |
| 4,717,770 A | 1/1988 | Sato et al. |
| 4,720,356 A | 1/1988 | Chu |
| 4,729,907 A | 3/1988 | Deal et al. |
| 4,734,295 A | 3/1988 | Liu |
| 4,759,453 A | 7/1988 | Paetzold |
| 4,781,647 A | 11/1988 | Doane, Jr. |
| 4,818,096 A | 4/1989 | Heller et al. |
| 4,826,550 A | 5/1989 | Shimizu |
| 4,826,977 A | 5/1989 | Heller et al. |
| 4,830,875 A | 5/1989 | Lindmayer |
| 4,835,475 A | 5/1989 | Hanakura et al. |
| 4,857,228 A | 8/1989 | Kabay |
| 4,880,667 A | 11/1989 | Welch |
| 4,884,860 A | 12/1989 | Brown |
| 4,898,895 A | 2/1990 | Masuoka et al. |
| 4,910,252 A | 3/1990 | Yonehara et al. |
| 4,913,544 A | 4/1990 | Rickwood et al. |
| 4,921,727 A | 5/1990 | Datta et al. |
| 4,927,180 A | 5/1990 | O'Trundle et al. |
| 4,943,896 A | 7/1990 | Johnson |
| 5,007,647 A | 4/1991 | Gulick |
| 5,023,015 A | 6/1991 | Lagos |
| 5,045,706 A | 9/1991 | Tanaka et al. |
| 5,066,818 A | 11/1991 | Gemert et al. |
| 5,081,171 A | 1/1992 | Nixon |
| 5,132,043 A | 7/1992 | Deboer |
| 5,132,045 A | 7/1992 | Osaka et al. |
| 5,135,591 A | 8/1992 | Vockel |
| 5,149,568 A | 9/1992 | Beck |
| 5,164,127 A | 11/1992 | Boeckeler |
| 5,176,905 A | 1/1993 | Ohno et al. |
| 5,185,390 A | 2/1993 | Fischer et al. |
| 5,219,625 A | 6/1993 | Matsunami et al. |
| 5,221,288 A | 6/1993 | Kamata |
| 5,223,330 A | 6/1993 | Vockel |
| 5,248,916 A | 9/1993 | Tong et al. |
| 5,260,252 A | 11/1993 | Frangie |
| 5,292,549 A | 3/1994 | Van Ooij et al. |
| 5,294,375 A | 3/1994 | Kampe et al. |
| 5,321,069 A | 6/1994 | Owens |
| 5,344,191 A | 9/1994 | Chang |
| 5,352,649 A | 10/1994 | Shibahashi et al. |
| 5,356,149 A | 10/1994 | Kane |
| 5,378,897 A | 1/1995 | Suzuki |
| 5,387,458 A | 2/1995 | Pavelka et al. |
| 5,389,093 A | 2/1995 | Howell |
| 5,391,327 A | 2/1995 | Ligas |
| 5,395,673 A | 3/1995 | Hunt |
| 5,409,797 A | 4/1995 | Hosoi et al. |
| 5,424,006 A | 6/1995 | Murayama et al. |
| 5,427,415 A | 6/1995 | Chang |
| 5,435,994 A | 7/1995 | Valenty |
| 5,439,785 A | 8/1995 | Boston et al. |
| 5,445,611 A | 8/1995 | Eppstein et al. |
| 5,446,150 A | 8/1995 | Rickwood |
| 5,478,381 A | 12/1995 | Ohiwa et al. |
| 5,480,482 A | 1/1996 | Novinson |
| 5,490,344 A | 2/1996 | Bussiere |
| 5,536,046 A | 7/1996 | Chang |
| 5,558,187 A | 9/1996 | Aberle |
| 5,581,090 A | 12/1996 | Goudjil |
| 5,605,734 A | 2/1997 | Yeh |
| 5,607,621 A | 3/1997 | Ishihara |
| 5,618,063 A | 4/1997 | Chang |
| 5,630,869 A | 5/1997 | Amon et al. |
| 5,644,352 A | 7/1997 | Chang et al. |
| 5,658,500 A | 8/1997 | Kumar et al. |
| 5,665,793 A | 9/1997 | Anders |
| 5,674,437 A | 10/1997 | Geisel |
| 5,692,895 A | 12/1997 | Farzin-Nia et al. |
| 5,698,301 A | 12/1997 | Yonetani |
| 5,708,181 A | 1/1998 | Hama et al. |
| 5,716,723 A | 2/1998 | Van Cleef et al. |
| 5,717,282 A | 2/1998 | Oomen et al. |
| 5,728,758 A | 3/1998 | Smith |
| 5,730,961 A | 3/1998 | Goudjil |
| 5,731,658 A | 3/1998 | Lengyel et al. |
| 5,744,233 A | 4/1998 | Opitz et al. |
| 5,753,146 A | 5/1998 | Van Gemert et al. |
| 5,770,115 A | 6/1998 | Misura |
| 5,774,997 A | 7/1998 | Gruen, Jr. |
| 5,789,015 A | 8/1998 | Gupta et al. |
| 5,789,021 A | 8/1998 | Dooms et al. |
| 5,807,625 A | 9/1998 | Amon et al. |
| 5,823,891 A | 10/1998 | Winskowicz |
| 5,833,349 A | 11/1998 | Apple |
| 5,839,718 A | 11/1998 | Hase et al. |
| 5,885,482 A | 3/1999 | Asaoka et al. |
| 5,914,076 A | 6/1999 | Schloss |
| 5,914,222 A | 6/1999 | Morrison et al. |
| 5,916,541 A | 6/1999 | Stewart |
| 5,938,544 A | 8/1999 | Winskowicz |
| 5,938,554 A | 8/1999 | Moster et al. |
| 5,973,034 A | 10/1999 | Mori et al. |
| 5,975,696 A | 11/1999 | Kohan |
| 5,976,717 A | 11/1999 | Holdik et al. |
| 5,985,381 A | 11/1999 | Conner |
| 5,989,135 A | 11/1999 | Welch |
| 6,005,024 A | 12/1999 | Anders et al. |
| 6,013,122 A | 1/2000 | Klitzman et al. |
| 6,013,980 A | 1/2000 | Goel et al. |
| 6,027,810 A | 2/2000 | Dalhquist |
| 6,046,455 A | 4/2000 | Ribi et al. |
| 6,048,347 A | 4/2000 | Erdman |
| 6,060,428 A | 5/2000 | Chang |
| 6,072,000 A | 6/2000 | Harui et al. |
| 6,096,443 A | 8/2000 | Malhotra et al. |
| 6,111,054 A | 8/2000 | Haubennestel et al. |
| 6,117,362 A | 9/2000 | Yen et al. |
| 6,130,781 A | 10/2000 | Gauvin |
| 6,139,779 A | 10/2000 | Small |

| | | |
|---|---|---|
| 6,165,234 A | 12/2000 | Kanakkannatt |
| 6,177,487 B1 | 1/2001 | Sapper et al. |
| 6,196,241 B1 | 3/2001 | Doolan |
| 6,201,057 B1 | 3/2001 | Porter |
| 6,207,077 B1 * | 3/2001 | Burnell-Jones .......... 252/301.36 |
| 6,267,911 B1 | 7/2001 | Yen et al. |
| 6,268,440 B1 | 7/2001 | Kudo et al. |
| 6,268,458 B1 | 7/2001 | Soane et al. |
| 6,271,333 B1 | 8/2001 | Okuhira |
| 6,277,037 B1 | 8/2001 | Winskowicz et al. |
| 6,290,873 B1 | 9/2001 | Takahashi |
| 6,294,258 B1 | 9/2001 | Gentile |
| 6,312,782 B1 | 11/2001 | Goldberg et al. |
| 6,344,233 B1 | 2/2002 | Jamil et al. |
| 6,358,160 B1 | 3/2002 | Winskowicz |
| 6,359,048 B1 | 3/2002 | Van Duynhoven |
| 6,375,864 B1 | 4/2002 | Phillips et al. |
| 6,391,492 B1 | 5/2002 | Kawakami et al. |
| 6,454,966 B1 | 9/2002 | Kobayashi et al. |
| 6,465,791 B1 | 10/2002 | Ribi et al. |
| 6,489,018 B2 | 12/2002 | Senga et al. |
| 6,499,995 B1 | 12/2002 | Schwartz |
| 6,500,555 B1 | 12/2002 | Khaldi |
| 6,508,732 B1 | 1/2003 | Romberger et al. |
| 6,514,594 B1 | 2/2003 | Wei et al. |
| 6,553,696 B1 | 4/2003 | Foster, Sr. |
| 6,596,816 B1 | 7/2003 | Haubennestel et al. |
| 6,599,444 B2 | 7/2003 | Burnell-Jones |
| 6,617,468 B2 | 9/2003 | Haubennestel et al. |
| 6,623,382 B2 | 9/2003 | Winskowicz |
| 6,623,791 B2 | 9/2003 | Sadvary et al. |
| 6,638,160 B2 | 10/2003 | Yoshitomi |
| 6,660,184 B2 | 12/2003 | Singh et al. |
| 6,660,324 B2 | 12/2003 | O'Rourke et al. |
| 6,710,127 B2 | 3/2004 | Haubennestel et al. |
| 6,746,724 B1 | 6/2004 | Robertson et al. |
| 6,750,266 B2 | 6/2004 | Bentsen et al. |
| 6,773,628 B2 | 8/2004 | Kinno |
| 6,800,684 B2 | 10/2004 | Hayashi et al. |
| 6,807,909 B1 | 10/2004 | Coots |
| 6,814,760 B2 | 11/2004 | Anderson et al. |
| 6,818,310 B2 | 11/2004 | Namiki et al. |
| 6,833,191 B2 | 12/2004 | Bayless |
| 6,861,467 B2 | 3/2005 | Nakano |
| 6,870,024 B2 | 3/2005 | Haubennestel et al. |
| 6,878,076 B2 | 4/2005 | Winskowicz |
| 6,894,124 B2 | 5/2005 | Matsuno et al. |
| 6,905,634 B2 | 6/2005 | Burnell-Jones |
| 6,953,536 B2 | 10/2005 | Yen et al. |
| 6,990,903 B2 | 1/2006 | Butland |
| 7,033,712 B2 | 4/2006 | Liang et al. |
| 7,050,387 B2 | 5/2006 | Tsujita et al. |
| 7,087,710 B2 | 8/2006 | Medsker et al. |
| 7,229,572 B2 | 6/2007 | Hampden-Smith et al. |
| 7,547,894 B2 * | 6/2009 | Agrawal et al. ............ 250/461.1 |
| 7,910,022 B2 * | 3/2011 | Agrawal et al. ............ 106/31.32 |
| 2002/0034475 A1 | 3/2002 | Ribi |
| 2002/0068166 A1 | 6/2002 | Senga et al. |
| 2003/0114562 A1 * | 6/2003 | Sitabkhan et al. ............ 524/261 |
| 2003/0219531 A1 | 11/2003 | Parsapour |
| 2003/0222247 A1 | 12/2003 | Putman et al. |
| 2004/0009833 A1 | 1/2004 | Selevan |
| 2004/0021407 A1 | 2/2004 | Baillie et al. |
| 2004/0033352 A1 | 2/2004 | Massa et al. |
| 2004/0152806 A1 | 8/2004 | Koga et al. |
| 2004/0169474 A1 | 9/2004 | Hampden-Smith et al. |
| 2004/0187417 A1 | 9/2004 | Thomas |
| 2005/0031838 A1 | 2/2005 | Lagunowich et al. |
| 2005/0197423 A1 * | 9/2005 | Fukuo et al. .................. 523/160 |
| 2005/0224764 A1 | 10/2005 | Ma et al. |
| 2005/0235848 A1 | 10/2005 | Butland |
| 2008/0121818 A1 * | 5/2008 | Agrawal et al. ............ 250/486.1 |

FOREIGN PATENT DOCUMENTS

| | | |
|---|---|---|
| EP | 0311157 A1 | 4/1989 |
| EP | 0318999 A2 | 6/1989 |
| EP | 0417490 A2 | 3/1991 |
| EP | 0438836 A1 | 7/1991 |
| EP | 0713894 A2 | 5/1996 |
| EP | 0721007 A1 | 7/1996 |
| EP | 0825249 B1 | 2/1998 |
| EP | 0838475 B1 | 4/1998 |
| EP | 0851452 B1 | 7/1998 |
| EP | 0977167 A1 | 2/2000 |
| EP | 1028001 B1 | 8/2000 |
| EP | 1176575 A1 | 1/2002 |
| EP | 1283106 A1 | 2/2003 |
| EP | 1306872 A2 | 5/2003 |
| EP | 1514910 A1 | 3/2005 |
| GB | 2153804 A | 8/1985 |
| JP | 60032234 A | 2/1985 |
| JP | 1249436 A | 10/1989 |
| JP | 3261596 A | 11/1991 |
| JP | 404358145 A | 12/1992 |
| JP | 9132648 A | 5/1997 |
| JP | 10036834 A | 2/1998 |
| JP | 11236524 A | 8/1999 |
| JP | 2000294130 A | 10/2000 |
| JP | 2001329047 A | 11/2001 |
| WO | 8807903 A1 | 10/1988 |
| WO | 0010551 A1 | 2/2001 |
| WO | 0179360 A1 | 10/2001 |
| WO | 0231065 A3 | 4/2002 |
| WO | 02098993 A1 | 12/2002 |
| WO | 02098995 A1 | 12/2002 |
| WO | 03018651 A1 | 3/2003 |
| WO | 03044092 A3 | 5/2003 |
| WO | 2004075624 A3 | 9/2004 |
| WO | 2004112482 A2 | 12/2004 |
| WO | 2005017048 A3 | 2/2005 |
| WO | 2005018370 A1 | 3/2005 |
| WO | 2005029163 A1 | 3/2005 |
| WO | 2005035461 A1 | 4/2005 |
| WO | 2005063484 A1 | 7/2005 |
| WO | 2005066278 A1 | 7/2005 |
| WO | 2005066995 A3 | 7/2005 |
| WO | 2006069028 A2 | 6/2006 |

OTHER PUBLICATIONS

Bartelson, C. J. et al. (Eds) "Optical Radiation Measurements: vol. 5—Visual Measurements," Academic Press, Inc. (1984), 655-662.

Yen, W. M. et al. "Inorganic Phosphors—Compositions, Preparation and Optical Properties," CRC Press (2004), 453-459.

Molecular Expressions Microscopy Primer: Specialized Microscopy Techniques—Fluorescence—Basic Concepts in Fluorescence (Last modified Apr. 2009), 1-18.

Judd, D.B. et al. (1975) In Color in Business, Science and Industry, 3rd Ed (NY: John Wiley & Sons), 29-32.

Sheehan, D. (2009) "Fluorescence Spectroscopy." In Physical Biochemistry: Principles and Applications, 2nd Ed (UK: Wiley-Blackwell), 64-66.

Workman, Jr., J. (Eds.) "Appendix D." In Applied Spectroscopy: A Compact Reference for Practitioners (NY: Academic Press, 1998), 518-519.

Definition of "Layer" from Merriam-Webster's Learner's Dictionary—no date.

Definition of "Layer" from Oxford Dictionaries Online—2011.

Definition of "Layer" from Webster's third New International Dictionary—1993.

Supplementary European Search Report for European Patent Application No. EP 05854703, dated Aug. 18, 2011.

* cited by examiner

Figure 7. - Photoluminescent film structure for use as a transfer label
a.) Transfer label prior to separation from release base #2, b.) Label after release from release base #2, c.) Transfer label after adhesion to substrate, d.) transfer label after release from release base #1.

Emission Measurement Apparatus

Measurements Performed on Photoluminescent Layers on a white reflective base using photopic detector, such as International Light Company's (Massachusetts,USA) "IL1700 Radiometer/Photometer with High Gain Luminance Detector."

FIGURE 12
FIG. 12A:
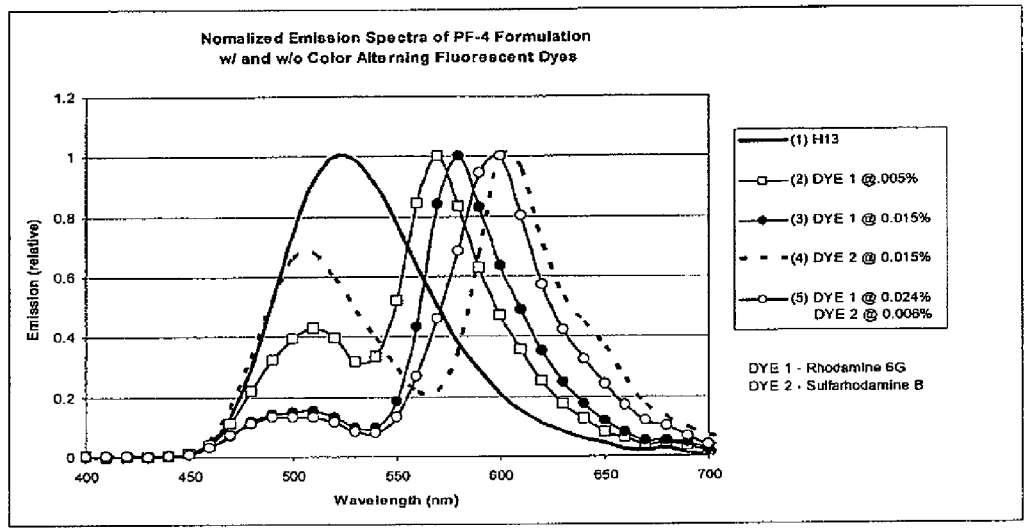
FIG. 12B:
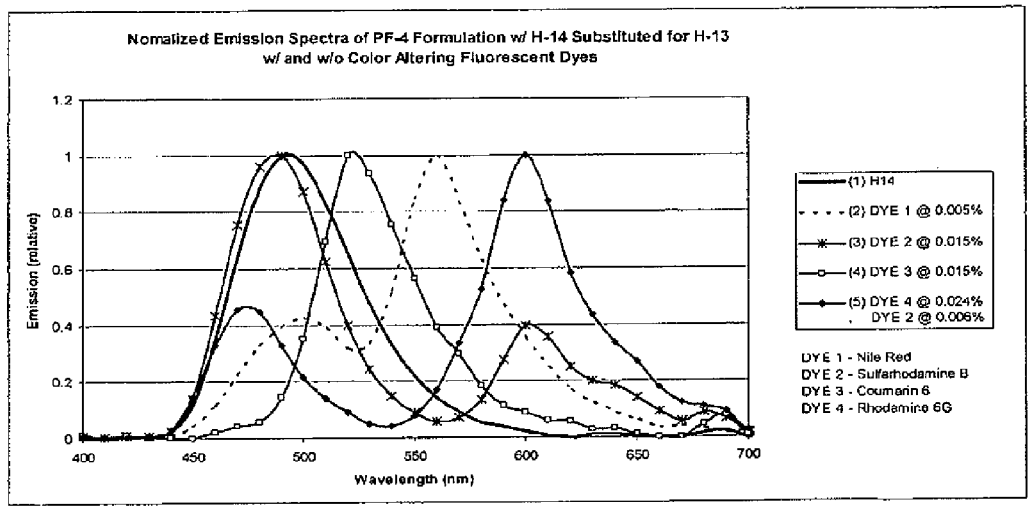

FIGURE 13
FIG. 13A:
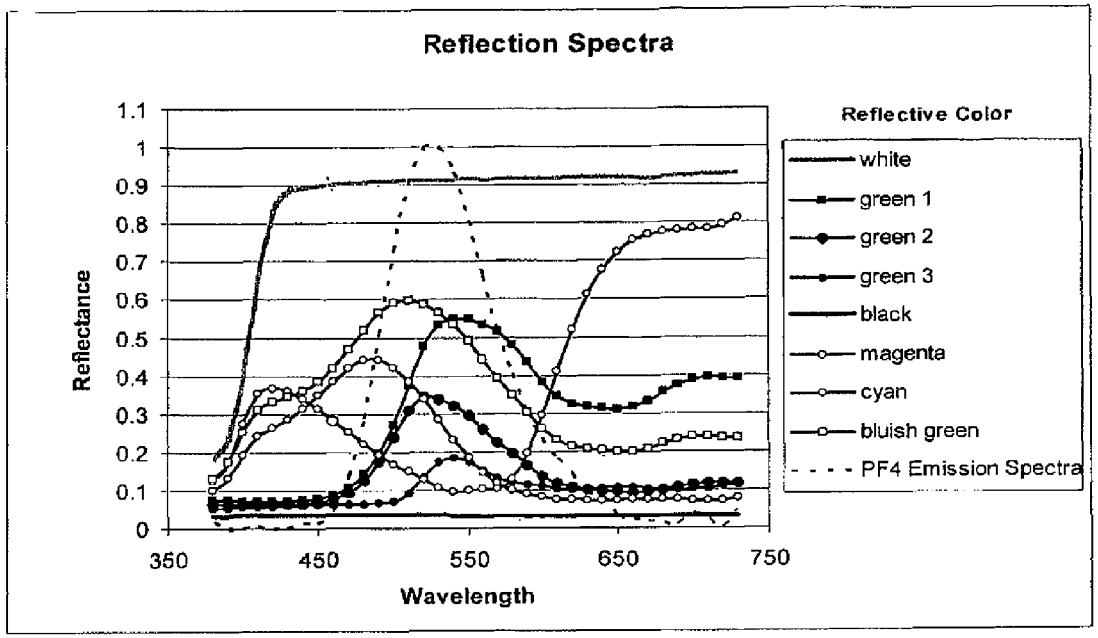
FIG. 13B:
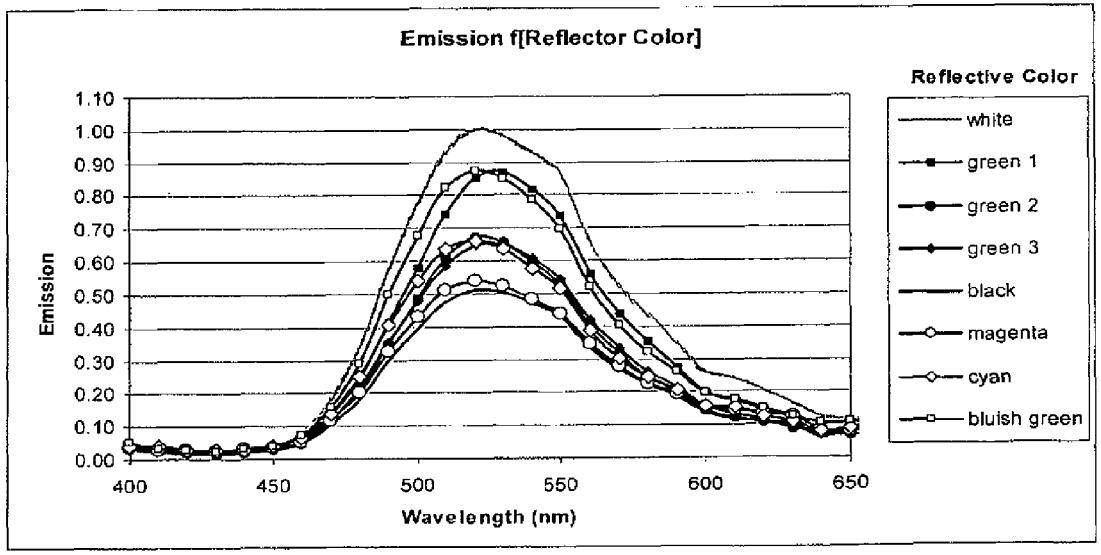

HIGH-INTENSITY, PERSISTENT PHOTOLUMINESCENT FORMULATIONS AND OBJECTS, AND METHODS FOR CREATING THE SAME

CROSS-REFERENCE TO RELATED APPLICATIONS

The present application is a divisional of the co-pending U.S. application Ser. No. 11/793,376, filed on Feb. 29, 2008, which is a U.S. national stage application under 35 U.S.C. 371 of PCT/US05/46039, filed on Dec. 20, 2005, which claims priority to U.S. Provisional Application Ser. No. 60/637,535, filed Dec. 20, 2004, all of which are incorporated herein in their entirety by reference.

BACKGROUND OF THE INVENTION

1. Field of the Invention

The present invention is directed to photoluminescent phosphorescent formulations, comprising an effective amount of photoluminescent phosphorescent materials, that exhibit high luminous intensity and persistence. The photoluminescent phosphorescent formulations may further comprise photoluminescent fluorescent materials, wherein said photoluminescent fluorescent materials increase the luminous intensity and persistence. These photoluminescent fluorescent formulations may further comprise photostabilizers to retard the photolytic degradation of said photoluminescent materials.

The present invention is also directed to photoluminescent objects comprising at least one photoluminescent formulation and a preformed article. Further disclosed are methods for creating photoluminescent objects comprising applying at least one photoluminescent formulation onto a preformed article.

2. Description of Related Art

Consumers have a continuing desire to receive added informational features and benefits from the products that they purchase. Such information and features can comprise safety information indicators, environmental information indicators, shelf-life information indicators, authentication and tamper indicators, fashion accessory benefits and/or fun and entertainment benefits. Color-change technology triggered by specific environmental events can form the foundation for creating these informational indicators or benefits. It is important to note that for the utilization of color-change as informational indicators or providing additional benefits to be effective, such color change needs to be visually striking and for outdoor usage environmentally robust.

"Envirochromic Materials" and "Envirochromic Layers" are those, when triggered by a specific environmental change or occurrence, that can change their visible color which can result from either onset or change in electromagnetic radiation emission, and/or change in the absorption reflection, and/or scattering of electromagnetic radiation. These environmental "triggers" include change in temperature, change in electromagnetic radiation, change in chemical environment, an electrical stimulus, etc.

Since color change can occur from a multiplicity of triggers, the word "chromic," as used herein, signifies a color change occurring from change in reflection, absorption, or scattering of electromagnetic radiation. "Chromic," as used herein, does not signify a color change occurring from change in emission. Thus, for example: photochromism signifies color change triggered by electromagnetic radiation; thermochromism signifies color change triggered by change in temperature; electrochromism signifies change in color occurring due to gain or loss of electrons; solvatochromism signifies color change resulting from change in solvent polarity; halochromism signifies color change caused by a change in pH; ionochromism signifies color change caused by ions; tribochromism signifies change in color caused by change in mechanical friction; and piezochromism signifies change in color caused by change in mechanical pressure.

As can be appreciated, color change can also result from luminescent emissions. For such a case, and being consistent with the definition above, "luminescent" or "luminous," as used herein, signifies color change resulting from emissions.

The term "luminescence" is defined as the emission of electromagnetic radiation from any substance. Luminescence occurs from electronically-excited states. As seen in FIG. 1, absorption of ultraviolet radiation by a molecule excites it from a vibrational level in the electronic ground state to one of the many vibrational levels in the electronic excited states. The electronic states of most organic molecules can be divided into singlet states and triplet states.

As used herein, "singlet state" refers to when all electrons in the molecule are spin-paired. As used herein, "triplet state" refers to when one set of electron spins is unpaired. The excited state is usually the first excited state. A molecule in a high vibrational level of the excited state will quickly fall to the lowest vibrational level of this state by losing energy to other molecules through collision. The molecule will also partition the excess energy to other possible modes of vibration and rotation.

"Luminescent materials" are those which emit electromagnetic radiation. Characterizing luminescent materials requires consideration of: (1) the excitation source, (2) the nature of the emission, and (3) whether or not additional stimulation is required to cause emission.

With regard to the excitation source, luminescent materials excited by electromagnetic radiation are referred to herein as "photoluminescent." Luminescent materials excited by electrical energy are referred to herein as "electroluminescent." Luminescent materials excited by a chemical reaction are referred to herein as "chemiluminescent."

With regard to the nature of the emission, this may be either fluorescence or phosphorescence. A "fluorescent" material stores electromagnetic radiation and releases it rapidly, in about $10^{-12}$ seconds or less. Contrarily, a "phosphorescent" material stores electromagnetic radiation and releases it gradually, in about $10^{-8}$ seconds or more.

Processes that occur between the absorption and emission of electromagnetic radiation are usually illustrated using a Jablonski Diagram, such as the one found in FIG. 2. Ground, first, and second electronic states are depicted in FIG. 2 by $S_0$, $S_1$, and $S_2$, respectively. At each electronic energy level, the fluorophores can exist in a number of vibrational energy levels, denoted by 0, 1, 2, etc. Transitions between states are depicted in FIG. 2 as vertical lines to illustrate the instantaneous nature of electromagnetic radiation absorption.

"Fluorescence" occurs when a molecule returns, by emission of a photon, from the excited singlet state to the electronic ground state. If the photon emission occurs from $S_1$ to $S_0$, it is characterized as fluorescence.

"Phosphorescence" occurs when a molecule goes from the ground state to a metastable state such as $T_1$, a triplet state, and then the metastable state slowly decays back to the ground state $S_0$, via photon emission. Hence, if the emission occurs between $T_1$ to $S_0$, it is characterized as phosphorescence.

With regard to whether or not additional stimulation is required to cause emission, as used herein, the need for "additional stimulation" is based upon the predominant behavior of the material at about room temperature, i.e., at about 10° C. to about 35° C. Thus, in cases where electromagnetic radiation is used to stimulate emission at room temperature, such materials are referred to as "photoluminescent photo-stimulable." In cases where electrical energy is used to stimulate emission at room temperature, such materials are referred to as "photoluminescent electrically-stimulable." In cases where thermal energy is used to stimulate emission at room temperature, such materials are referred to as "photoluminescent thermally-stimulable."

The instant invention applies and uses photoluminescent phosphorescent materials to cause nighttime emissions, which may additionally comprise photoluminescent fluorescent materials to enhance the intensity and persistence of the nighttime emission and/or the color of the daytime and nighttime emissions.

In the past, metal sulfide pigments were used in an attempt to arrive at photoluminescent phosphorescent materials. See, e.g., U.S. Pat. No. 6,207,077 to Burnell Jones. A common such metal sulfide pigment is a zinc sulfide structure whereby the zinc is substituted and activation occurs via various elemental activators, coactivators, or compensators. Common activators include copper, aluminum, silver, gold, manganese, gallium, indium, scandium, lead, cerium, terbium, europium, gadolinium, samarium, praseodymium, and other rare-earth elements and halogens. These activators are believed to enter the crystal lattice of the host material and are responsible for imparting the luminescent properties to the material.

Examples of sulfide phosphorescent phosphors include CaS:Bi, which emits violet blue light; CaStS:Bi, which emits blue light; ZnS:Cu, which emits green light; and ZnCdS:Cu, which emits yellow or orange light. However, these sulfide phosphorescent phosphors are chemically-unstable and, as a result, exhibit photolytic instability An extensively-used sulfide phosphorescent phosphor is zinc sulfide, ZnS:Cu. See, e.g., U.S. Pat. No. 3,595,804 to Martin. However, zinc sulfide decomposes due to irradiation by ultraviolet radiation in the presence of moisture. This decomposition reduces and/or blackens the luminance, making the use of zinc sulfide difficult in environments containing ultraviolet radiation and/or moisture. As a result, zinc sulfide is used most-commonly in controlled environments, such as for clock, watch, and instrument dials, and for indoor uses.

Relatively recently, see, e.g., U.S. Pat. No. 5,424,006 to Murayama, metal aluminate photoluminescent pigments, particularly alkaline earth aluminate oxides having the formula $MAl_2O_4$, where M is a metal or mixture of metals, have been developed. Examples of such alkaline aluminate oxides include strontium aluminum oxide, $SrAl_2O_4$, calcium aluminum oxide, $CaAl_2O_4$, barium aluminum oxide, $BaAl_2O_4$, and mixtures thereof. These aluminate phosphors, with or without added magnesium, may be further activated with other metals and rare-earth elements.

These aluminate photoluminescent pigments exhibit afterglow characteristics that last much longer in duration than do those of metal sulfide pigments. These aluminate photoluminescent pigments also exhibit strong photolytic stability and are chemically more stable than the metal sulfide pigments. For example, strontium aluminum oxide, $SrAl_2O_4$, such as that disclosed in U.S. Pat. No. 5,698,301 to Yonetani, exhibits luminance that is about five- to ten-times that of zinc sulfide phosphorescent phosphor, ZnS:Cu, and exhibits a smaller decay rate. Strontium aluminum oxide also exhibits an emission spectrum having a peak wavelength of 520 nanometers ("nm"), which is near the spectrum of peak human visibility, and exhibits a broad excitation spectrum with high excitation efficiency to ultraviolet electromagnetic radiation in the short wavelength region.

However, alkaline earth phosphors, such as strontium aluminum oxide, exhibit the disadvantage of requiring more excitation time to attain saturation luminance than do metal sulfide pigments, such as zinc sulfide phosphorescent phosphor. In addition, alkaline earth phosphors have the disadvantage of moisture sensitivity. On the other hand, sulfide-based phosphors degrade photolytically.

It can be appreciated that for optimal luminescent performance, specific photoluminescent phosphorescent materials and mixtures of such materials need to be adapted for use in varying conditions, be it excitation conditions or environmental considerations. Water-resistant formulations suitable for protecting the photoluminescent phosphorescent particles and formulations that minimize photolytic degradation, particularly where metal sulfides are utilized, are sought-after. Beyond the selection of the photoluminescent phosphorescent materials and/or any additional photoluminescent fluorescent materials used to enhance their performance, it should be noted that the luminous intensity and/or persistence from a photoluminescent formulation is greatly affected by both the way in which the photoluminescent phosphorescent material is distributed and the additives used, as well as the manner in which that formulation is applied. As noted above, for these materials to serve as color-change indicators or to provide added information and/or benefits to consumers, the color change needs to be visually striking to be effective.

The improper selection and use of formulation materials, such as resins, dispersants, wetting agents, thickeners, and the like can diminish the luminous intensity emanating from the formulation. This can occur, for example, due to agglomeration or settling of photoluminescent phosphorescent particles, either during handling of the formulated materials or after application of the formulated materials. The reduction in luminous intensity and/or persistence can result from both incomplete excitations and/or due to scattering of emitted radiation. The scattering of photoluminescent emissions can be either due to agglomeration of photoluminescent phosphorescent material or as a consequence of electromagnetic radiation scattering by of one or more of the additives selected to stabilize the photoluminescent phosphorescent pigment dispersion. The net result will be lower luminous intensity and persistence.

By and large, the current practice in commercially-available materials is to cite the luminous intensity and persistence of the underlying photoluminescent phosphorescent powder, rather than that of the resulting photoluminescent object. It can be recognized that for commercial success, the important parameter is not the photoluminescent intensity and persistence of the underlying powder, but that of the resulting photoluminescent object. There is a need, therefore, to not only develop photoluminescent phosphorescent powder materials of high performance but also develop photoluminescent formulations that result in photoluminescent emissions of high intensity and persistence.

Articles having inadequate reflection to the emitted electromagnetic radiation, either because of surface roughness or because of their color resulting from materials that are absorptive of photoluminescent phosphorescent emissions, can also result in degradation of luminous intensity and persistence even when high-performance formulations are applied to such articles to create photoluminescent objects. Further, outdoor usage of photoluminescent objects also necessitates, beyond good adhesion to substrates, mechanical robustness such as scratch resistance, etc. Specific requirements are dictated by the particular application, for which the use of a protective layer can also be highly beneficial. It can therefore be seen that beyond the need to develop photoluminescent formulations of high performance, there is a need for a multi-layer system construction for applying these formulations to articles to create photoluminescent objects of high intensity and persistence of nighttime emissions.

The use of colorants in the form of pigments that are absorptive of visible electromagnetic radiation to impart daylight color to photoluminescent formulations even when they are not absorptive of phosphorescent emissions can result in degradation of photoluminescent intensity and persistence by virtue of either scattering of photoluminescent phosphorescent emissions or by inadequate charging of photoluminescent phosphorescent materials. The latter phenomenon can result if the particle size of the absorptive colorants is small enough. Hence, while absorptive colorants can be used to alter the daytime appearance of photoluminescent objects, such usage will result in a lowering of luminous intensity and persistence. This is why a majority of daylight-colored formulations are rated for low intensity and persistence. Further, such usage also precludes the achievement of daytime colors and nighttime emissions being in the same family of colors.

U.S. Pat. No. 6,359,048 to Duynhoven discloses formulations of photoluminescent phosphorescent materials utilizing alkyd resins and modified castor oil rheology modifiers. This formulation requires using a secondary pigment particle, which, due to scattering of electromagnetic radiation, results in lower transmissivity of photoluminescent phosphorescent emissions, and thus lower perceived intensity and persistence of emissions from objects deploying this formulation.

U.S. Pat. No. 6,773,628 to Kinno discloses formulations of photoluminescent phosphorescent materials comprising synthetic cellulosic resin binders and silica-based powders used as suspending fillers. The silica-based suspending fillers, by virtue of either scattering of luminescent phosphorescent emissions, or, if sufficiently small, by virtue of scattering of charging radiation, will result in a lowering of perceived intensity and persistence of luminescent objects deploying this formulation.

Published U.S. Patent Application No. 2003/0222247 to Putman discloses the use of absorptive pigments as colorants for imparting daytime color. Again, as discussed above, on account of scattering of photoluminescent phosphorescent emissions, the intensity and persistence of nighttime emissions from photoluminescent objects deploying this formulation will be lowered.

U.S. Pat. No. 3,873,390 to Cornell discloses a method of making single-layer photoluminescent phosphorescent or fluorescent films utilizing silica gel, which scatters electromagnetic radiation, to disperse the phosphorescent or fluorescent pigments. While this makes the film translucent, again, as stated above, there will be a reduction in photoluminescent intensity and persistence. Moreover, since the resin matrix selected for the pigments is a hot-melt adhesive, it requires heating coating fluid to temperatures in vicinity of 2950° F. or higher. The resulting application methodology is too restrictive for many applications.

U.S. Pat. No. 4,208,300 to Gravisse discloses single-layer phosphorescent coatings which comprise "Crystalline charges" in amounts of 50% to 65% by weight of the phosphorescent layer. Use of such high amounts of crystalline fillers is indicative of a basic composition that has low transmissivity to phosphor emissions without the crystalline fillers. Uses of such high amounts of filler material will not only result in significantly lower concentrations of phosphorescent pigments, but also, since these fillers are silica-based, they will also result in a lowering of luminous efficiency.

U.S. Pat. No. 4,211,813 to Gravisse discloses the making of flexible photoluminescent articles comprising a single-layer phosphorescent coating for applications requiring high water vapor transmissivity. This requirement does not result in a degradation of the phosphor materials, since they are ZnS-based. It is now well-appreciated that the photoluminescent intensity and persistence of ZnS-based materials is significantly lower, as compared to the newer alkaline earth materials which however can be degraded by water. Hence, the need remains for construction of photoluminescent objects that have low water vapor transmission and still exhibit nighttime emissions of high intensity and persistence.

U.S. Pat. No. 5,698,301 to Yonetani teaches the construction of a phosphorescent article embodying a three-layer construction, that is, a reflective layer, a photoluminescent layer, and a clear protective layer, without use of photoluminescent fluorescent materials. This invention does not require specific performance characteristics of each of the layers. With respect to the photoluminescent layer, all that is suggested is "dispersing a phosphorescent pigment in a varnish prepared by dissolving a resin in a solvent thereby preparing an ink." Alkaline earth materials, such as strontium aluminates, are not easy to disperse and unless one achieves a construction of such a layer without photoluminescent phosphorescent particle agglomeration, there will be loss of efficiency due to incomplete charging. Also, since photoluminescent phosphorescent materials have high densities, without using specific additives, there will be settling and compaction as the film dries, resulting in a lower amount of nighttime emissions from the surface. It should also be noted that common additives for addressing these issues, e.g., silica, scatter electromagnetic radiation, causing the layer's transmissivity to photoluminescent phosphorescent emissions to be lower.

U.S. Pat. No. 5,395,673 to Hunt discloses the construction of a non-slip phosphorescent surface by applying to a ground surface epoxy resin containing compositions impregnated with phosphor pigment of the zinc sulfide type. The focus of this invention is on the creation of a hard surface with photoluminescent phosphorescent materials incorporated therein, and not on methodologies to maximize intensity and persistence of nighttime emissions.

U.S. Pat. No. 5,692,895 to Franzin Nia discloses the rudimentary concept of a photoluminescent phosphorescent orthodontic appliance utilizing the older, zinc sulfide-type phosphors. The phosphorescent pigment can be deposited onto the exposed bracket surfaces utilizing methods such as glazing, ion beam implantation, plasma coating, and the like. However, since the appliances are based on the older sulfide-type photoluminescent phosphorescent materials, the resulting intensity and persistence of the emissions will be significantly lower and, further, the materials will be subject to rapid photolytic degradation.

U.S. Pat. No. 6,207,077 to Burnell-Jones discloses the application of photoluminescent phosphorescent coatings to fiber optic articles using a curable layer construction, as well as a variety of fillers. The fillers include suspending fillers, such as silica, for preventing settling of phosphor particles, tailoring viscosity, etc. The heavy loading of filler materials, in the neighborhood of 30%, negatively impacts the amount of photoluminescent material present, thus requiring much thicker photoluminescent layers. In addition, due to scattering of electromagnetic radiation from the quantity and type of filler materials deployed, there will be a reduction in the intensity and persistence of nighttime emissions from the objects deploying this formulation.

U.S. Pat. No. 6,508,732 to Romberger discloses the construction of a tennis ball that includes an outer fabric cover that contains a photoluminescent phosphorescent component. The object of this invention is a luminescent tennis ball and not on methodologies to maximize intensity and persistence of nighttime emissions.

Accordingly, in view of the above, there remains a need for photoluminescent phosphorescent material formulations, photoluminescent phosphorescent objects, and methods for creating such objects, wherein the formulations and objects not only exhibit high intensity and persistence, but also which can be created in a variety of daytime and nighttime colors, also with high luminous intensity and persistence, and additionally including creation of photoluminescent objects wherein the daytime and nighttime colors are in the same family. The photoluminescent objects are also created to minimize photolytic degradation, do not degrade with moisture, and are mechanically robust, particularly in outdoor applications.

BRIEF SUMMARY OF THE INVENTION

It has now been found that formulations comprising an effective amount of photoluminescent phosphorescent materials, at least one liquid carrier medium, at least one polymeric resin, and at least one formulation stabilizing additive, wherein said photoluminescent phosphorescent materials are uniformly distributed within said formulation, wherein there are no additional materials that are absorptive colorant pigments, and further wherein said stabilizing additive is not in a solid particulate state in said liquid carrier medium provide photoluminescent phosphorescent formulations with high intensity and persistence.

Accordingly, in one of its formulation aspects, the present invention is directed to a photoluminescent formulation comprising an effective amount of photoluminescent phosphorescent materials, at least one liquid carrier medium, at least one polymeric resin, and at least one formulation stabilizing additive, wherein said photoluminescent phosphorescent materials are uniformly distributed within said formulation, wherein there are no additional materials that are absorptive colorant pigments, and further wherein said stabilizing additive is not in a solid particulate state in said liquid carrier medium.

In another one its formulation aspects, the present invention is directed to a photoluminescent formulation comprising an effective amount of photoluminescent phosphorescent materials, at least one liquid carrier medium, at least one polymeric resin, and at least one formulation stabilizing additive, wherein said photoluminescent phosphorescent materials are uniformly distributed within said formulation, wherein there are no additional materials that are absorptive colorant pigments, wherein said formulation stabilizing additive comprises a dispersing agent and a rheology modifier, and further wherein said stabilizing additive is not in a solid particulate state in said liquid carrier medium.

In other formulation aspects, the present invention is directed to the foregoing photoluminescent formulations which further comprise photoluminescent fluorescent materials, wherein said fluorescent materials either increase the luminous intensity or alter the emission spectrum of the photoluminescent phosphorescent materials to not only create a variety of luminous colors, but also enable the daylight color and emission color to be in the same color family. These photoluminescent formulations comprising said fluorescence-exhibiting materials may further comprise photostabilizers to retard photolytic degradation of said photoluminescent materials.

In one of its object aspects, the present invention is directed to a photoluminescent object comprising a preformed article and at least one photoluminescent layer that results from a photoluminescent formulation.

In another one of its object aspects, the present invention is directed to a photoluminescent object comprising a preformed article, at least one photoluminescent layer, and at least one reflective layer, wherein said reflective layer results from a reflective formulation, wherein said photoluminescent layer is distal to said preformed article, wherein said reflective layer is proximal to said preformed article, and wherein said reflective layer is characterized by a reflectance such that the total emission from said object is greater than 80% relative to that of a white reflectance layer.

In yet another one of its object aspects, the present invention is directed to a photoluminescent object comprising a preformed article, at least one photoluminescent layer, and at least one protective layer, wherein said protective layer results from a protective formulation, wherein said protective layer is distal to said preformed article, wherein said photoluminescent layer is proximal to said preformed article, and wherein said protective layer has an FT of at least 95%.

In yet another one of its object aspects, the present invention is directed to a photoluminescent object comprising a preformed article, at least one reflective layer, at least one photoluminescent layer, and at least one protective layer, wherein said reflective layer is proximal to said preformed article, wherein said protective layer is distal to said preformed article, and wherein said photoluminescent layer is between said reflective layer and said protective layer, and wherein said protective layer has an FT of at least 95%.

In one of its method aspects, the present invention is directed to a method for creating a photoluminescent object, said method comprising the steps of obtaining a preformed article and applying to said preformed article at least one photoluminescent formulation.

In another one of its method aspects, the present invention is directed to a method for creating a photoluminescent object, said method comprising the steps of obtaining a preformed article, applying to said preformed article at least one photoluminescent formulation, and applying to said preformed article at least one reflective formulation, wherein said photoluminescent formulation is distal to said preformed article, wherein said reflective layer is proximal to said preformed article, and further wherein said reflective layer is characterized by a reflectance such that the total emission from said object is greater than 80% relative to that of a white reflectance layer.

In another one of its method aspects, the present invention is directed to a method for creating a photoluminescent object, said method comprising the steps of obtaining a preformed article, applying to said preformed article at least one photoluminescent formulation, and applying to said preformed article at least one protective formulation, wherein the protective layer is distal to said preformed article, wherein the photoluminescent layer is proximal to said preformed article, and wherein the protective layer has an FT of at least 95%.

In yet another of its method aspects, the present invention is directed to a method for creating a photoluminescent object, said method comprising the steps of obtaining a preformed article, applying to said preformed article at least one reflective formulation, at least photoluminescent formulation, and at least one protective formulation, wherein said reflective layer is proximal to said preformed article, wherein said protective layer is distal to said preformed article, and wherein said photoluminescent layer is between said reflective layer and said protective layer, and wherein said protective layer has an FT of at least 95%.

BRIEF DESCRIPTION OF THE DRAWINGS

FIG. 12A shows the emission spectra of the photoluminescent phosphorescent layers resulting from the PF-4 formulations, with and without the addition of emission color-altering fluorescing compounds.

FIG. 12B shows the emission spectra of the photoluminescent phosphorescent layers resulting from PF-4 formulations where photoluminescent phosphorescent material H-13 has been substituted by H-14, with and without the addition of emission color-altering fluorescing compounds.

FIG. 13A shows the reflection spectra from reflective layers of various colors.

FIG. 13B shows the emission spectra of the photoluminescent layer with reflective layers of various colors.

DETAILED DESCRIPTION OF THE INVENTION

Figure 1:
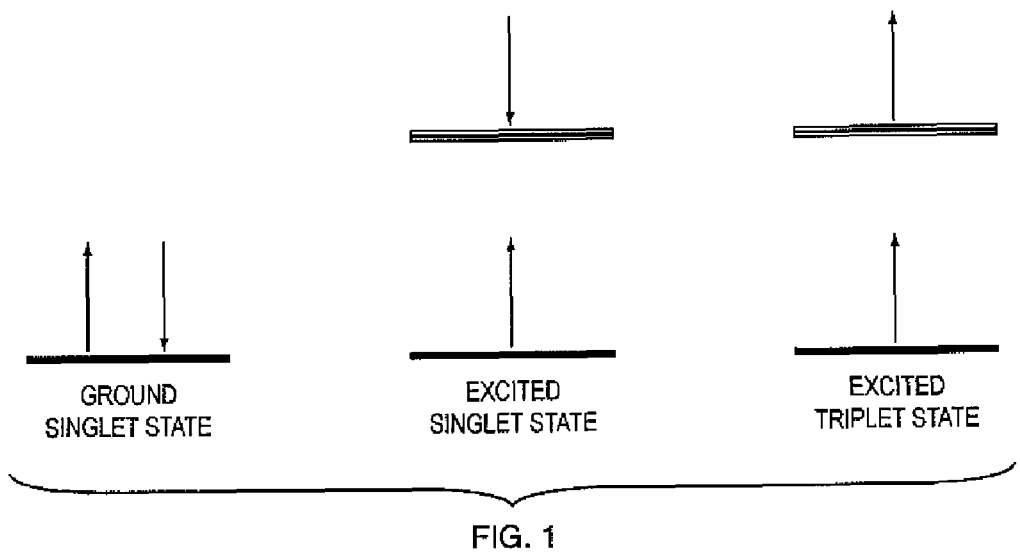
FIG. 1 illustrates how absorption of ultraviolet radiation by a molecule excites it from a vibrational level in the electronic ground state to one of the many vibrational levels in the electronic excited state, such as singlet states and triplet states.
Figure 2:
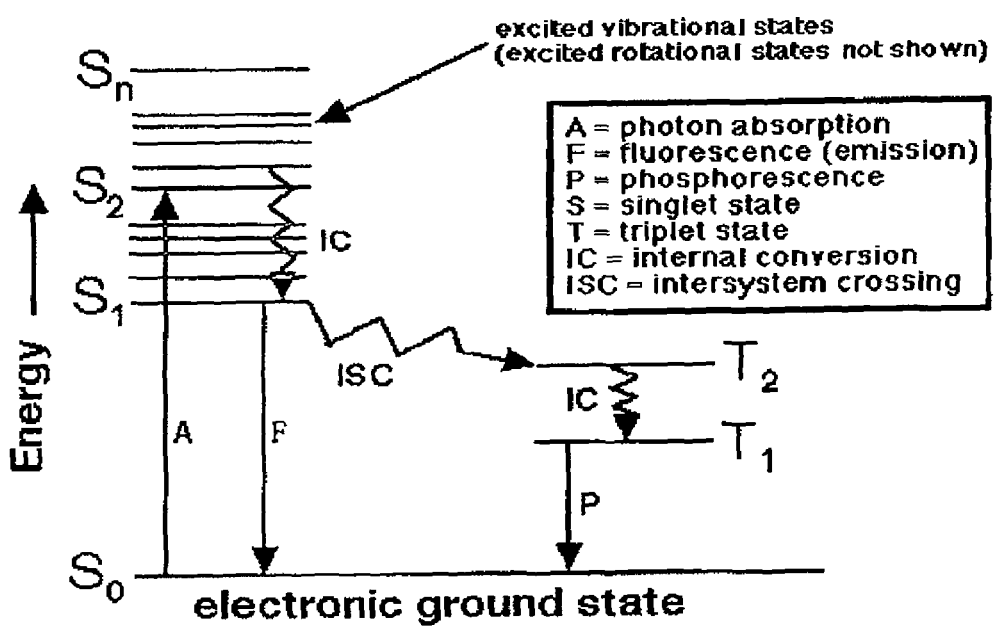
FIG. 2 is a Jablonski Diagram illustrating processes that occur between the absorption and emission of electromagnetic radiation.
Figure 3:
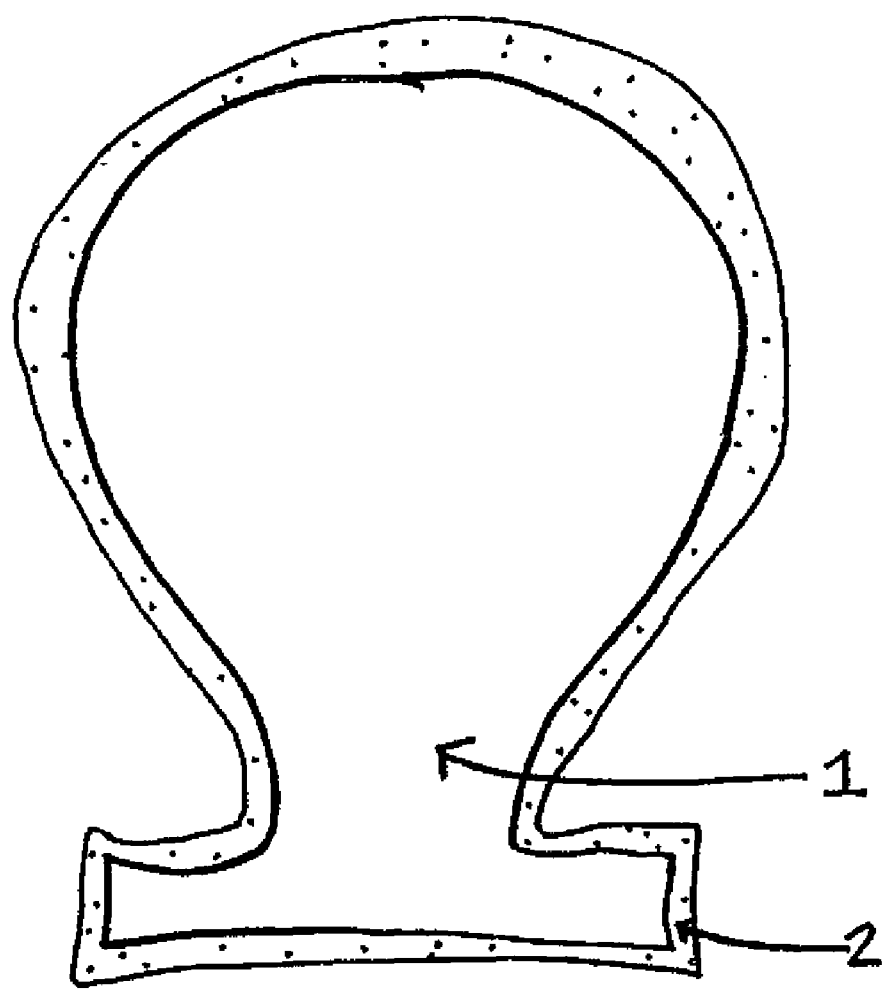
FIG. 3 is a stylized depiction of an embodiment of the invention whereby a photoluminescent object is created using a preformed article 1 with a photoluminescent phosphorescent layer 2 applied thereto.
Figure 4:
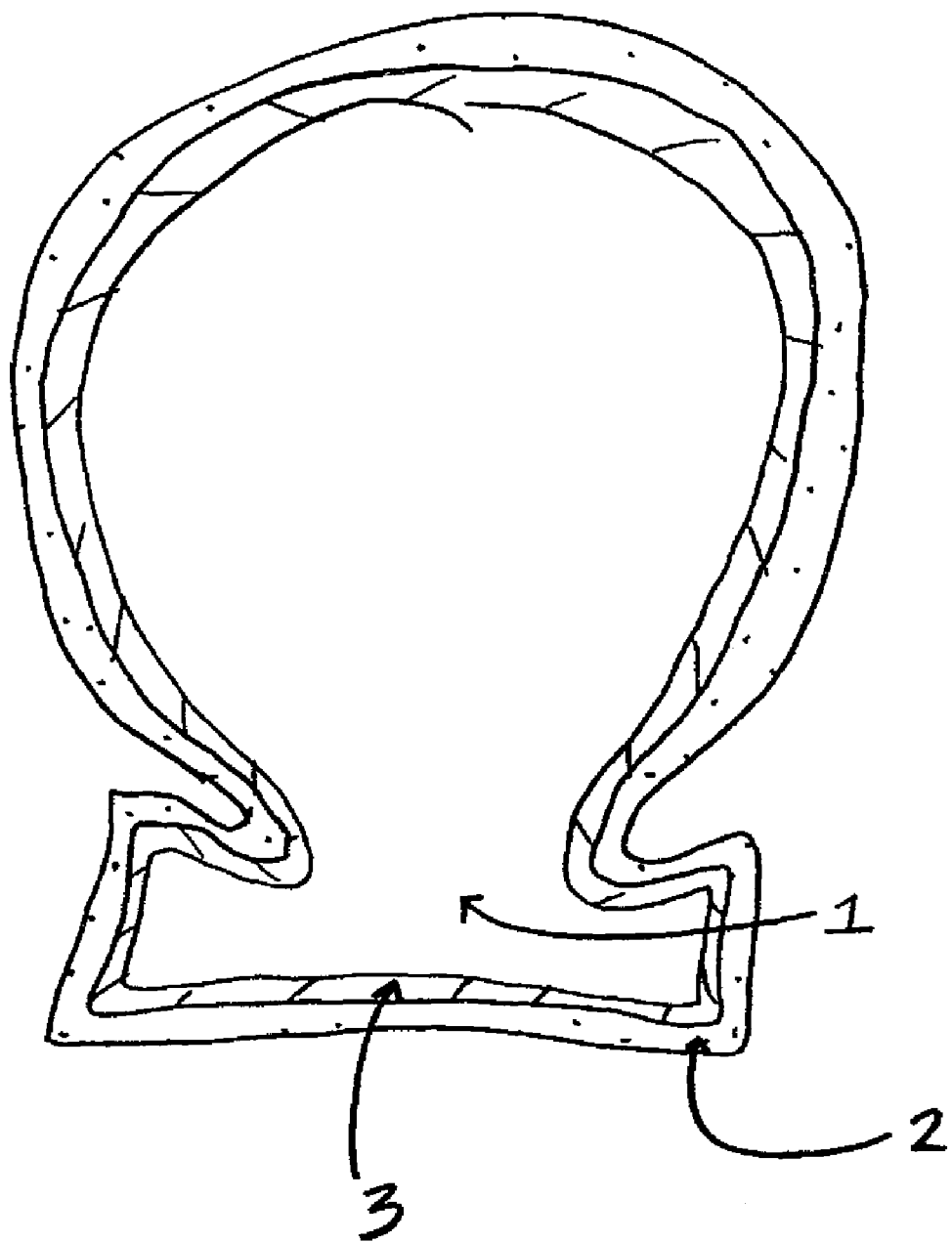
FIG. 4 is a stylized depiction of an embodiment of the invention whereby a photoluminescent object is created using a preformed article 1 with a reflective layer 3 and a photoluminescent phosphorescent layer 2 applied thereto.
Figure 5:
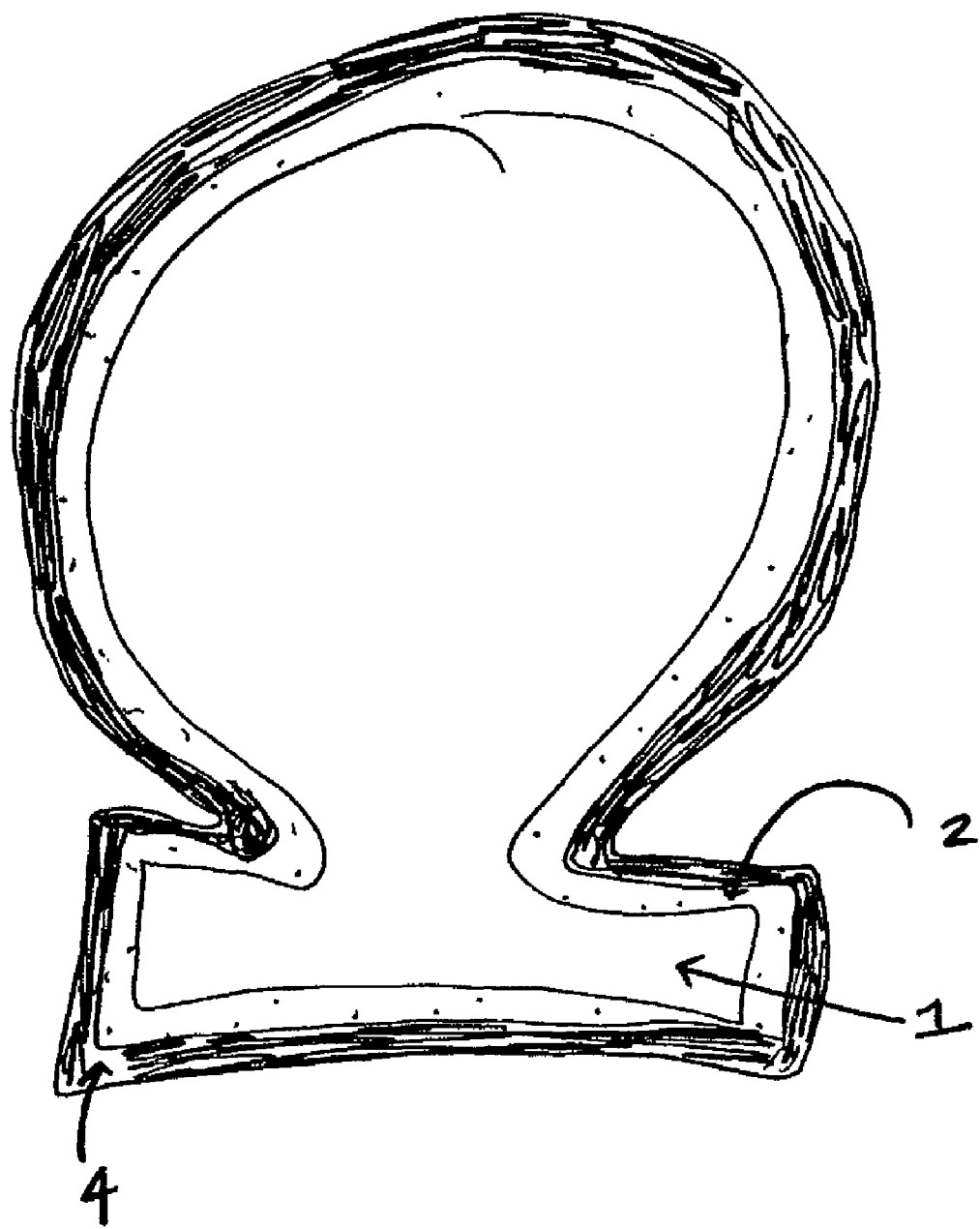
FIG. 5 is a stylized depiction of an embodiment of the invention whereby a photoluminescent object is created using a preformed article 1 with a photoluminescent phosphorescent layer 2 and a protective layer 4 applied thereto.
Figure 6:
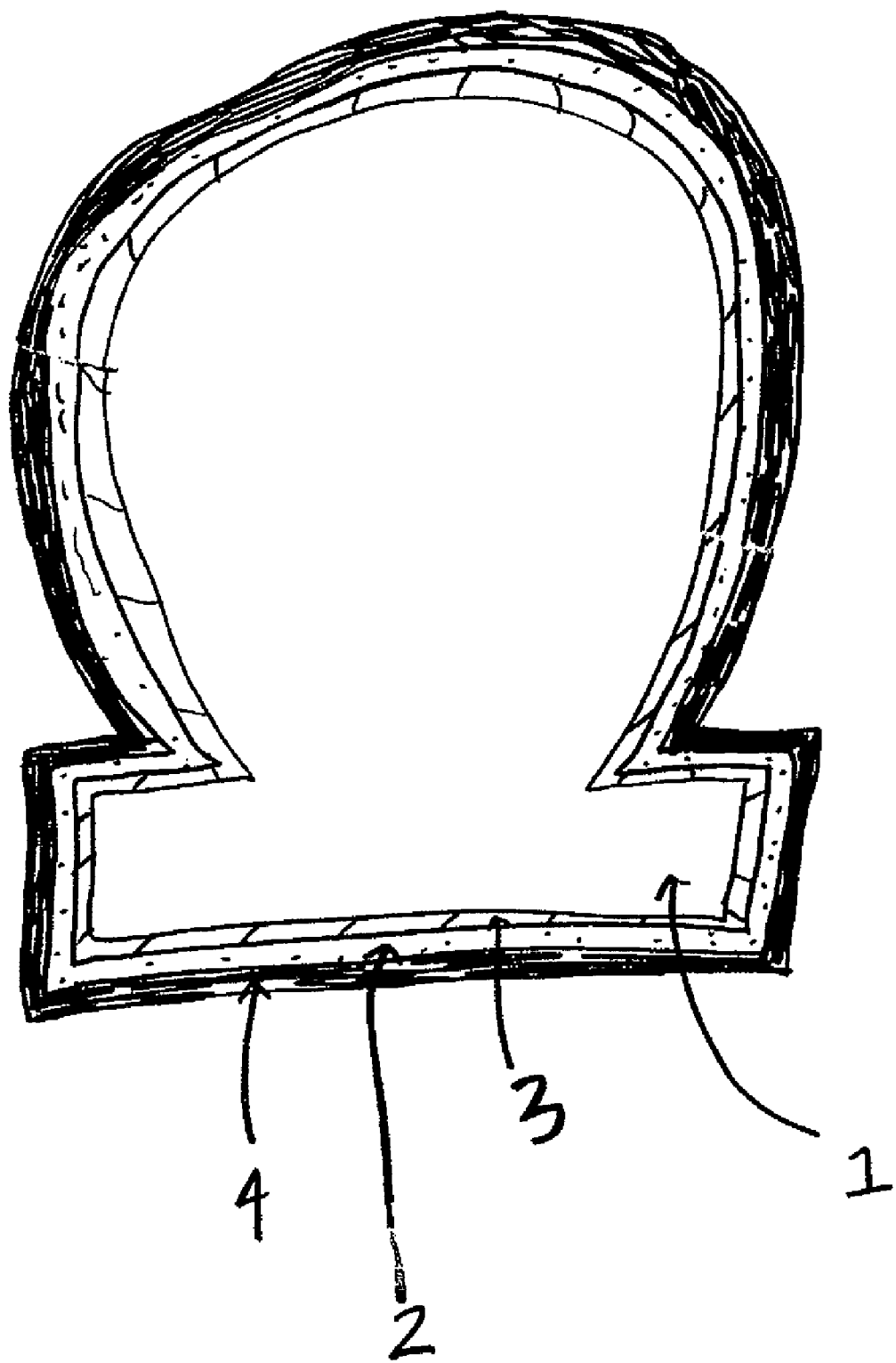
FIG. 6 is a stylized depiction of an embodiment of the invention whereby a photoluminescent object is created using a preformed article 1 with a reflective layer 3, a photoluminescent phosphorescent layer 2, and a protective layer 4 applied thereto.
Figure 7:
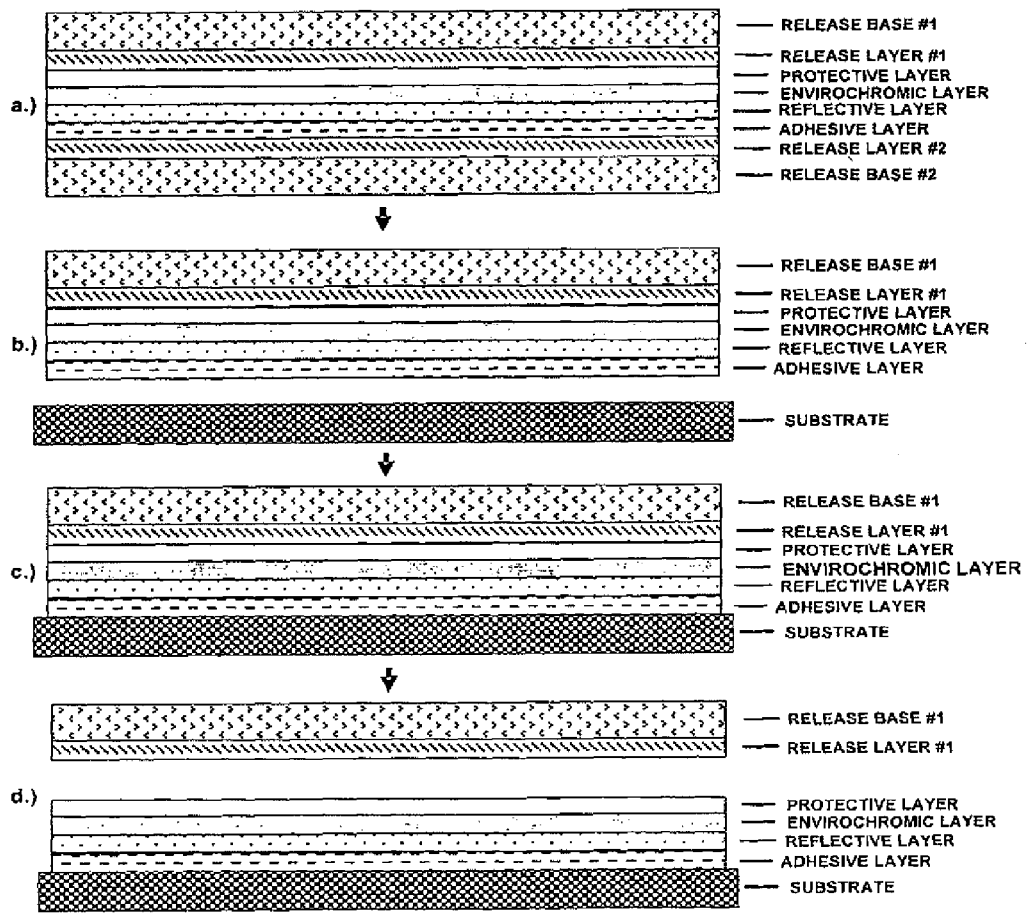
FIG. 7 is a stylized depiction of an embodiment of the invention whereby transfer technology is used to obtain the photoluminescent object.
Figure 8:
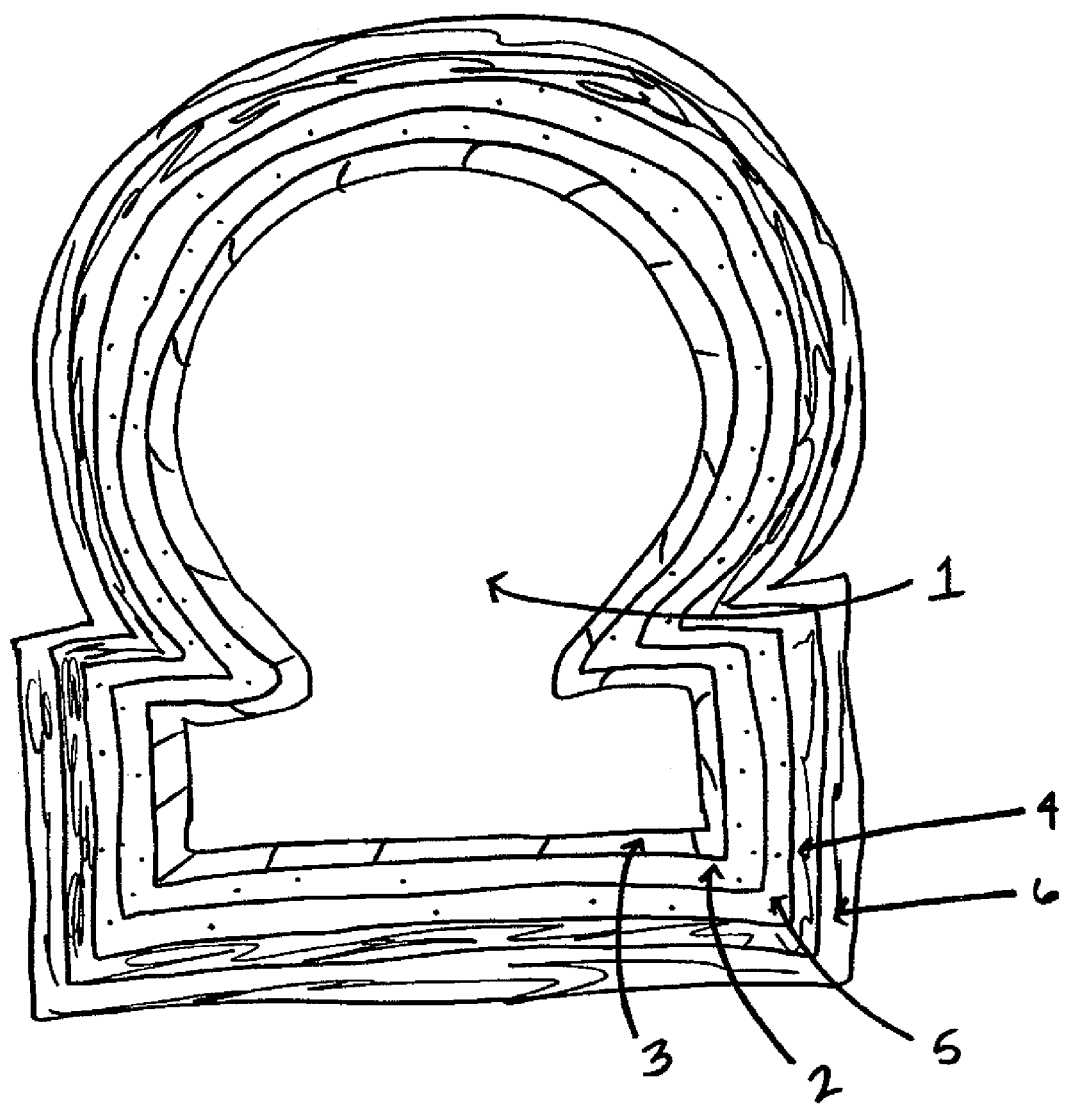
FIG. 8 is a stylized depiction of an embodiment of the invention whereby a photoluminescent object is created using a preformed article 1 with a reflective layer 3, a first photoluminescent phosphorescent layer 2, a second photoluminescent phosphorescent layer 5, a first protective layer 4, and second protective layer 6 applied thereto.
Figure 9:
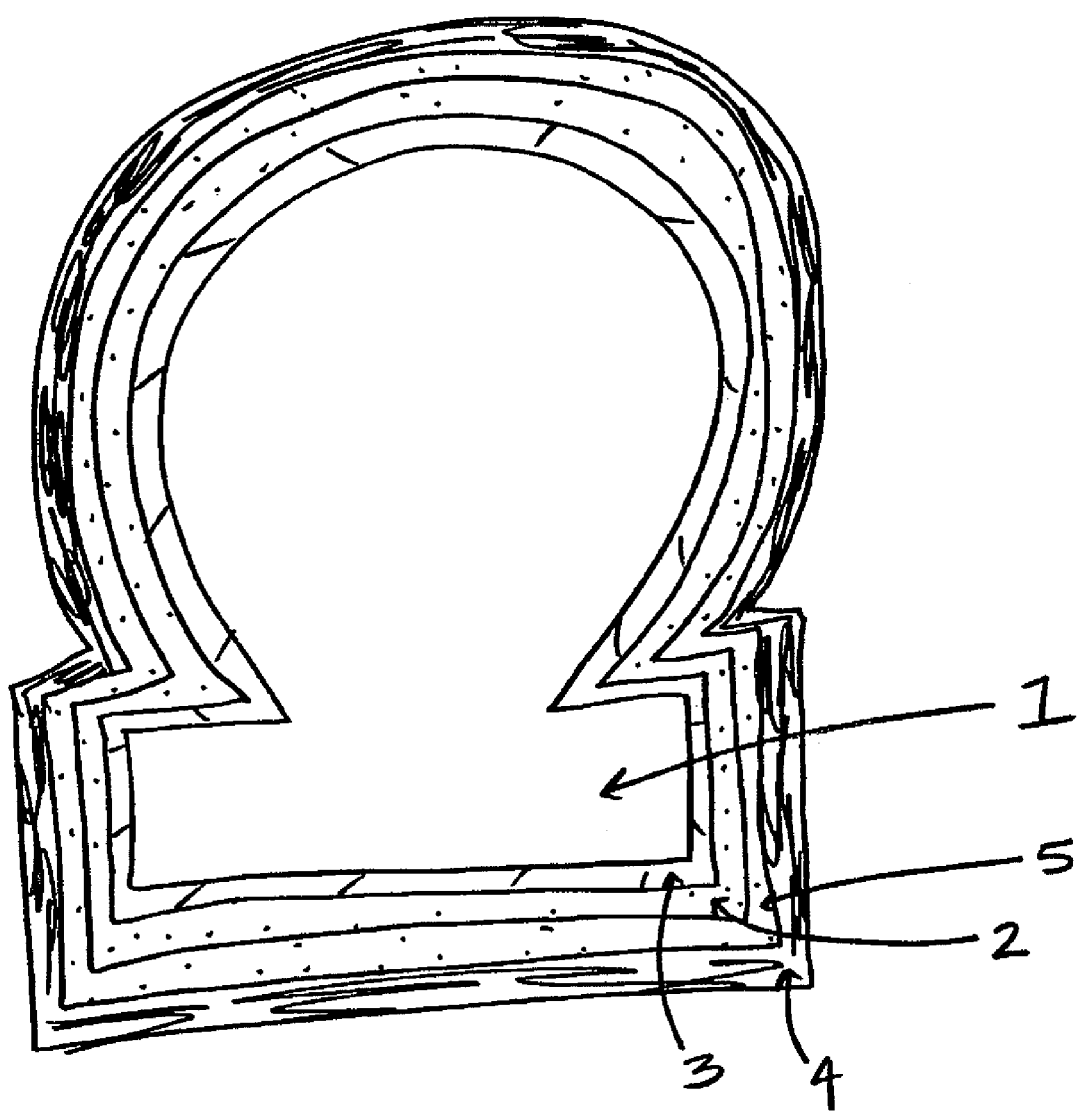
FIG. 9 is a stylized depiction of an embodiment of the invention whereby a photoluminescent object is created using a preformed article 1 with a reflective layer 3, a first photoluminescent phosphorescent layer 2, a second photoluminescent phosphorescent layer 5, and a first protective layer 4 applied thereto.
Figure 10:
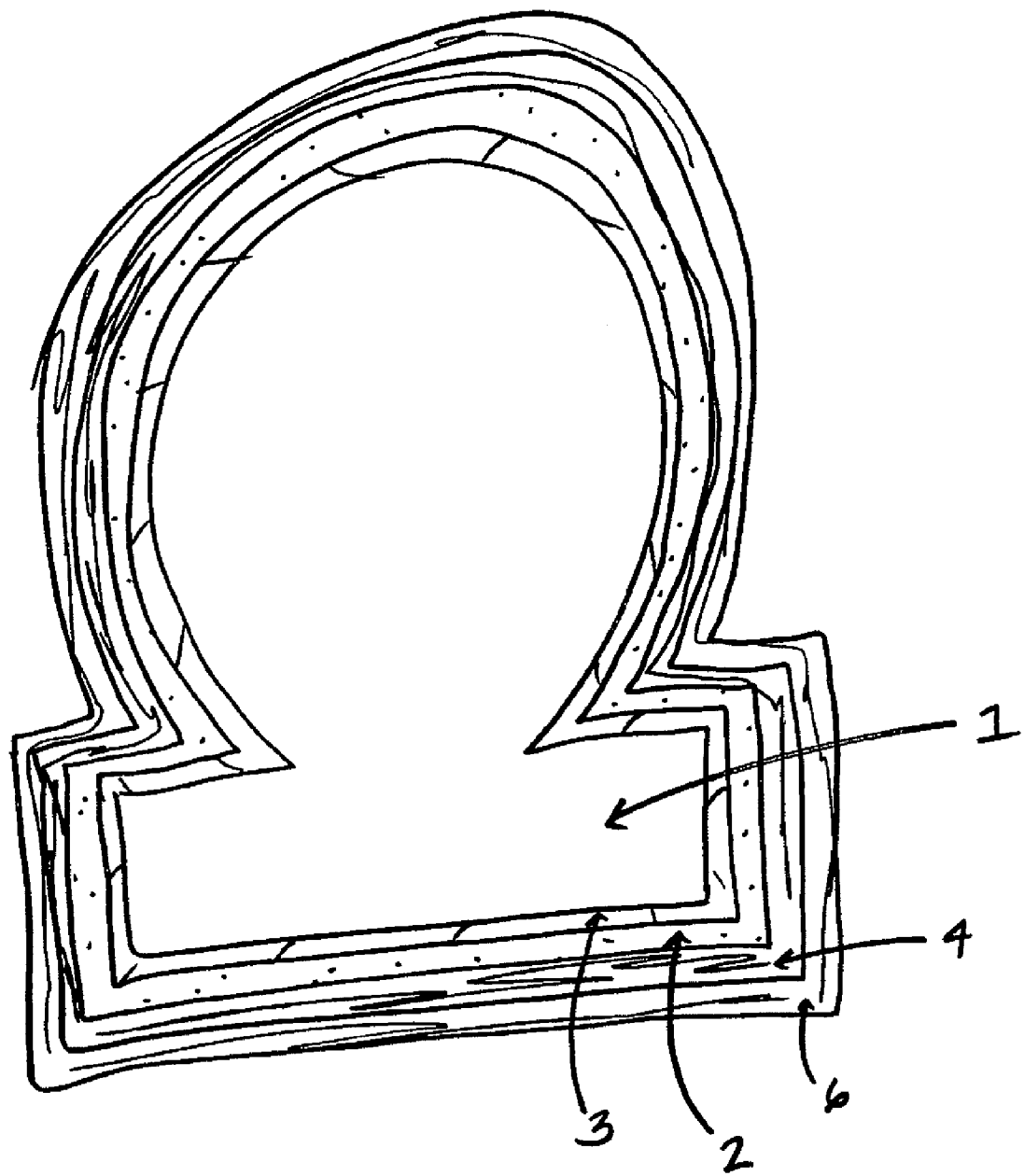
FIG. 10 is a stylized depiction of an embodiment of the invention whereby a photoluminescent object is created using a preformed article 1 with a reflective layer 3, a first photoluminescent phosphorescent layer 2, a first protective layer 4, and second protective layer 6 applied thereto.

As noted above, the present invention generally relates to photoluminescent formulations, to photoluminescent objects comprising preformed articles onto which said photoluminescent formulations have been applied, and to methods for creating said photoluminescent objects.

However, prior to discussing this invention in detail, the following terms will first be defined.

As used herein, "excitation" refers to the phenomenon wherein the incident radiation excites a molecule from a lower energy state to a higher energy state.

As used herein, "luminescence" is defined as emission of electromagnetic radiation.

As used herein, "photoluminescence" is luminescence occurring as a consequence of excitation by electromagnetic radiation.

As used herein, "fluorescence" is emission of electromagnetic radiation from singlet excited states in which the electron in the excited orbital is paired (of opposite sign) to the second electron in the ground state orbital, and wherein the return to the ground state is spin allowed and occurs rapidly by emission of a photon and wherein the emission rates are typically $10^{-8}$ s$^{-1}$ with a typical lifetime around 10 nanoseconds.

"Phosphorescence" is emission of electromagnetic radiation from triplet excited states, in which the electron in the excited orbital has the same spin orientation as the ground state electron. Transitions to the ground state are forbidden and the emissions rates are slow. Phosphorescence lifetimes are typically milliseconds to seconds.

As used herein, "luminescent materials" are those that exhibit "luminescence."

"Photoluminescent materials" are those that exhibit luminance as a consequence of excitation by electromagnetic radiation.

"Photoluminescent fluorescent" materials are those which upon excitation by electromagnetic radiation exhibit fluorescence.

As used herein, "photoluminescent phosphorescent" materials are those which upon excitation by electromagnetic radiation exhibit phosphorescence.

As used herein, "pigment" is a material in a solid particulate form which is substantially insoluble in a liquid carrier medium chosen to carry such materials, but which can be mechanically distributed in the liquid carrier medium to modify its color and/or electromagnetic radiation-scattering properties.

"Liquid carrier medium" is a liquid that acts as a carrier for materials distributed in a solid state and/or dissolved therein.

As used herein, a "formulation" is a liquid carrier medium, as defined above, comprising at least one material either dissolved and/or distributed in a solid state within said liquid carrier medium.

As used herein, "dispersion" is a formulation, as defined above, wherein said material is a solid distributed in the liquid carrier medium, also as defined above.

As used herein, a "photoluminescent fluorescent formulation" is a formulation, as defined above, which additionally comprises materials exhibiting fluorescence that are either distributed in a solid state in said formulation or are dissolved in said formulation As used herein, a "photoluminescent phosphorescent formulation" is a formulation, as defined above, which additionally comprise materials exhibiting phosphorescence that are distributed in a solid state in said formulation.

As used herein, a "photoluminescent formulation" is a formulation, as defined above, which additionally comprises either photoluminescent phosphorescent materials as defined above, or photoluminescent fluorescent materials as defined above, or both.

As used herein, a "reflective formulation" is a formulation as defined above, which comprises at least a polymeric resin in a liquid carrier medium as defined above, and further comprises at least one colorant (white or non-white).

"Stabilizing additive" is a material added to a formulation comprising solid particles or a dispersion, as defined above, to uniformly distribute, prevent agglomeration, and/or prevent settling of solid material in said dispersion in said liquid carrier medium to result in an enhancement of the luminous intensity. Such stabilizing additives generally comprise dispersants, and/or rheology modifiers.

A "performance-enhancing additive" is a material added to a formulation comprising solid particles or a dispersion, as defined above, to enhance its applicability to articles to create photoluminescent objects with a smooth surface and/or to minimize scattering or surface roughness due to entrained air.

As used herein, a "protective formulation" is a formulation as defined above, which comprises at least a polymeric resin selected for environmental or mechanical protection of the underlying article, upon application onto said article.

As used herein, a "photoluminescent phosphorescent layer" is a film resulting from at least one photoluminescent phosphorescent formulation that is substantially dry as characterized by the residual liquid carrier medium being in the range of 1-5 weight % of the total weight of the film.

As used herein, a "photoluminescent fluorescent layer" is a film resulting from at least one photoluminescent fluorescent formulation that is substantially dry, as characterized by the residual liquid carrier medium being in the range of 1-5 weight % of the total weight of the film.

As used herein, a "photoluminescent layer" is a film resulting from either a photoluminescent fluorescent, or photoluminescent phosphorescent formulation, or both, that is substantially dry, as characterized by the residual liquid carrier medium being in the range of 1-5 weight % of the total weight of the film.

A "reflective layer" is a film resulting from a "reflective formulation" as defined above, that is substantially dry, as characterized by the residual liquid carrier medium being in the range of 1-5 weight % of the total weight of the film, and which is at least substantially reflective of incident photoluminescent phosphorescent radiation.

A "white reflectance layer" is one that reflects 95% of visible electromagnetic radiation incident upon it.

A "protective layer" is a film resulting from a "protective formulation" as defined above comprising a polymeric resin that is substantially dry as characterized by the residual liquid carrier medium being in the range of 1-5 weight % of the total weight of the film. Such layers protect photoluminescent layers and reflective layers from, for example, photolytic degradation, moisture, mechanical degradation, etc.

As used herein, "visible electromagnetic radiation" is characterized by electromagnetic radiation with wavelengths in the region of 400 nanometers ("nm")) to 700 nm.

As used herein, "Film Transmissivity" ("FT") is the fraction of incident visible electromagnetic radiation transmitted through a layer which does not have any photoluminescent materials.

"Photolytic degradation" is deterioration, degradation, or change in properties, such as observed color, that is initiated by electromagnetic radiation.

As used herein, "photostabilizer" materials are UV absorbers, singlet oxygen scavengers, antioxidants, and/or mixtures thereof.

As used herein photopic is used to characterize luminous measurements based on human perception.

As used herein, "intensity" is a measure of electromagnetic radiation as perceived by the "Standard Observer" (see, e.g., C. J. Bartelson and F. Grum, OPTICAL RADIATION MEASUREMENTS, VOLUME 5—VISUAL MEASUREMENTS (1984), incorporated herein by reference for all purposes) as mimicked by a photopic detector, such as International Light Company's (Massachusetts, USA) "IL1700 Radiometer/Photometer with High Gain Luminance Detector."

As used herein, "luminous intensity" is a measure of emitted of electromagnetic radiation as perceived by the "Standard Observer" (see, e.g., C. J. Bartelson and F. Grum, OPTICAL RADIATION MEASUREMENTS, VOLUME 5—VISUAL MEASUREMENTS (1984), incorporated herein by reference for all purposes) as mimicked by a photopic detector, such as International Light Company's (Massachusetts, USA) "IL1700 Radiometer/Photometer with High Gain Luminance Detector."

As used herein, a "preformed article" is any article onto which photoluminescent layers may be formed. The preformed article may be rigid or flexible.

A "photoluminescent object" is any preformed article, as defined above, onto which is at least one photoluminescent phosphorescent layer is applied.

The present invention is directed to photoluminescent formulations comprising an effective amount of photoluminescent phosphorescent materials, at least one liquid carrier medium, at least one polymeric resin, and at least one formulation stabilizing additive, wherein said photoluminescent phosphorescent materials are uniformly distributed within said formulation, wherein there are no additional materials that are absorptive colorant pigments, and further wherein said stabilizing additive is not in a solid particulate state in said liquid carrier medium.

The present invention is also directed to photoluminescent formulations comprising an effective amount of photoluminescent phosphorescent materials, at least one liquid carrier medium, at least one polymeric resin, and at least one formulation stabilizing additive, wherein said photoluminescent phosphorescent materials are uniformly distributed within said formulation, wherein there are no additional materials that are absorptive colorant pigments, wherein said formulation stabilizing additive comprises a dispersing agent and a rheology modifier, and further wherein said stabilizing additive is not in a solid particulate state in said liquid carrier medium.

Generally, the photoluminescent formulations according to this invention contain photoluminescent phosphorescent materials in the range of about 30% to about 55%, liquid carrier medium in the range of about 25% to about 55%, polymeric resin in the range of about 15% to about 35%, stabilizing additive in the range of about 0.25% to about 20%, and performance-enhancing additives in the range of about 0% to about 5%, based on the weight of the formulation.

The present invention is also directed to the foregoing photoluminescent formulations wherein said photoluminescent phosphorescent materials are not radioactive and are not metal sulfide-type materials.

In another embodiment, the photoluminescent phosphorescent materials in the foregoing formulations are alkaline-earth aluminates, alkaline-earth silicates, alkaline-earth aluminosillicates, or combinations thereof. The photoluminescent phosphorescent materials may be metal oxide aluminates activated by europium and at least one co-activator selected from the group consisting of dysprosium, lanthanum, cerium praseodymium, neodymium, samarium, gadolinium, holmium, erbium, thulium, ytterbium, lutetium, tin, manganese, and bismuth, wherein said metal is one or more of strontium, calcium, magnesium, and barium.

In another embodiment, the present invention is directed to photoluminescent phosphorescent formulations wherein the polymeric resin is selected from the group consisting of acrylates, polyvinyl chlorides, polyurethanes, polycarbonates, and polyesters, and combinations thereof.

In another embodiment, the present invention is directed to photoluminescent phosphorescent formulations wherein the formulation stabilizing additive is a dispersant selected from the group consisting of acrylic acid-acrylamide polymers, or salts of amine functional compound and acid, hydroxyfunctional carboxylic acid esters with pigment affinity groups, and combinations thereof.

In another embodiment, the present invention is directed to photoluminescent phosphorescent formulations wherein the formulation stabilizing additive is a polymeric urea urethane.

In another embodiment, the present invention is directed to photoluminescent phosphorescent formulations wherein the polymeric resin is selected from the group consisting of acrylates, polyvinyl chlorides, polyurethanes, polycarbonates, and polyesters, and combinations thereof and wherein the stabilizing additive further comprises a performance-enhancing additive that is a wetting agent.

In another embodiment, the present invention is directed to photoluminescent phosphorescent formulations wherein the polymeric resin is selected from the group consisting of acrylates, polyvinyl chlorides, polyurethanes, polycarbonates, and polyesters, and combinations thereof; wherein the stabilizing additive further comprises a performance-enhancing additive that is a wetting agent, and wherein the formulation has an FT of at least 95%.

In another embodiment, the present invention is directed to photoluminescent formulations wherein the dispersing agent is selected from the group consisting of acrylic acid-acrylamide polymers, or salts of amine functional compound and acid, hydroxyfunctional carboxylic acid esters with pigment affinity groups, and combinations thereof, wherein said rheology modifier is a polymeric urea urethane, and further wherein said wetting agent is selected from the group consisting of polyether siloxane copolymers, non-ionic organic surfactants, and combinations thereof.

In another embodiment, the present invention is directed to photoluminescent phosphorescent formulations wherein the polymeric resin is selected from the group consisting of acrylates, polyvinyl chlorides, polyurethanes, polycarbonates, and polyesters, and combinations thereof, and wherein the stabilizing additive further comprises a performance-enhancing additive that is a wetting agent and a deaerator/defoamer.

In another embodiment, the present invention is directed to photoluminescent phosphorescent formulations wherein the polymeric resin is selected from the group consisting of acrylates, polyvinyl chlorides, polyurethanes, polycarbonates, and polyesters, and combinations thereof, wherein the stabilizing additive further comprises a performance-enhancing additive that is a wetting agent and a deaerator/defoamer, and wherein the formulation has an FT of at least 90%.

In another embodiment, the present invention is directed to photoluminescent phosphorescent formulations wherein the dispersing agent is an acid-acrylamide polymer, salts of amine functional compound and acid, hydroxyfunctional carboxylic acid esters with pigment affinity groups, or combinations thereof, wherein the rheology modifier is polymeric urea urethane, wherein the wetting agent is Polyether siloxane copolymer, non-ionic organic surfactants, or combinations thereof, and further wherein the deaerator/defoamer is organic modified polysiloxanes with fumed silica.

In another embodiment, the present invention is directed to photoluminescent phosphorescent formulations wherein the photoluminescent phosphorescent material is H-13, H-14, green phosphor pigment, or blue phosphor pigment, wherein the polymeric resin is NeoCryl B-818, NeoCryl B-735, NeoCryl B-813, or combinations thereof, wherein the dispersing agent is DISPERBYK-180, DISPERBYK-181, DISPERBYK-108, or Tego Disperse 710, wherein the rheology modifier is BYK-410 or BYK-411, wherein the wetting agent is Tego Wet 270 or Tego Wet 500, and further wherein the deaerator/defoamer is Tego Airex 900.

In another embodiment, the present invention is direct to the photoluminescent phosphorescent formulations which further comprise photoluminescent fluorescent materials.

In another embodiment, the present invention is directed to the foregoing photoluminescent phosphorescent formulations comprising fluorescent materials and further comprising photostabilizers.

In another embodiment, the present invention is directed to the foregoing photoluminescent phosphorescent formulations comprising fluorescent materials wherein at least some of the photoluminescent fluorescent materials are excitation-altering photoluminescent fluorescent materials, wherein the excitation-altering photoluminescent fluorescent materials increase the luminous intensity of the photoluminescent formulation.

In another embodiment, the present invention is directed to the foregoing photoluminescent phosphorescent formulations comprising fluorescent materials wherein at least some of the photoluminescent fluorescent materials are excitation-altering photoluminescent fluorescent materials, wherein the excitation-altering photoluminescent fluorescent materials increase the luminous intensity of the photoluminescent formulation, and wherein the fluorescent materials are in solution in the liquid carrier medium.

In another embodiment, the present invention is directed to photoluminescent phosphorescent formulations comprising fluorescent materials wherein at least some of the photoluminescent fluorescent materials are emission color-altering fluorescent materials, wherein the emission color-altering fluorescent materials alter the emission spectrum of the photoluminescent formulation to alter the perceived color as compared to the perceived color prior to addition of the photoluminescent fluorescent material.

In another embodiment, the present invention is directed to photoluminescent phosphorescent formulations comprising fluorescent materials wherein at least some of the photoluminescent fluorescent materials are emission color-altering fluorescent materials, wherein the emission color-altering fluorescent materials alter the emission spectrum of the photoluminescent formulation to alter the perceived color as compared to the perceived color prior to addition of the photoluminescent fluorescent material, and wherein the photoluminescent materials are in solution in the liquid carrier medium.

In another embodiment, the present invention is directed to photoluminescent phosphorescent formulations comprising fluorescent materials that are emission color-altering fluorescent materials, wherein the emission color-altering fluorescent materials alter the emission spectrum of the photoluminescent formulation to alter the perceived color as compared to the perceived color prior to addition of the photoluminescent fluorescent material.

In another embodiment, the present invention is directed to photoluminescent phosphorescent formulations comprising fluorescent materials that are emission color-altering fluorescent materials, wherein the emission color-altering fluorescent materials alter the emission spectrum of the photoluminescent formulation to alter the perceived color as compared to the perceived color prior to addition of the photoluminescent fluorescent material, and wherein the photoluminescent fluorescent materials are in solution in the liquid carrier medium.

In another embodiment, the present invention is directed to photoluminescent phosphorescent formulations comprising fluorescent materials or fluorescent materials and photostabilizers, wherein at least some of the photoluminescent fluorescent materials alter the daylight color of the formulation as compared to the daylight color without the photoluminescent fluorescent materials.

In another embodiment, the present invention is directed to photoluminescent phosphorescent formulations comprising fluorescent materials or fluorescent materials and photostabilizers, wherein at least some of the photoluminescent fluorescent materials alter the daylight color of the formulation as compared to the daylight color without the photoluminescent fluorescent materials, and wherein the photoluminescent fluorescent materials are in solution in the liquid carrier medium.

In another embodiment, the present invention is directed to photoluminescent phosphorescent formulations comprising fluorescent materials or fluorescent materials in solution in the liquid carrier medium wherein at least some of the photoluminescent fluorescent materials are excitation-altering photoluminescent fluorescent materials, wherein the excitation-altering photoluminescent fluorescent materials increase the luminous intensity of the photoluminescent formulation, and wherein the excitation-altering photoluminescent fluorescent materials are selected from the group consisting of coumarins, styrylbenzenes, oxazoles, carbostyryls, stilbenes, and combinations thereof.

In another embodiment, the present invention is directed to photoluminescent phosphorescent formulations comprising fluorescent materials or fluorescent materials in solution in the liquid carrier medium, wherein at least some of the photoluminescent fluorescent materials are emission color-altering fluorescent materials, wherein the emission color-altering fluorescent materials alter the emission spectrum of the photoluminescent formulation to alter the perceived color as compared to the perceived color prior to addition of the photoluminescent fluorescent material, and wherein the emission color-altering fluorescent materials are selected from the group consisting of Xanthene type fluorescent dyes including rhodamine and fluorescene dyes, coumarin dyes, phenoxazone dyes including nile red, nile blue, cresyl violet, phoenoxazoles styryl type dyes, Carbostyryl type dyes, Stilbene type dyes, and combinations thereof.

In another embodiment, the present invention is directed to photoluminescent phosphorescent formulations comprising fluorescent materials or fluorescent materials in solution in the liquid carrier medium, that are emission color-altering fluorescent materials, wherein the emission color-altering fluorescent materials alter the emission spectrum of the photoluminescent formulation to alter the perceived color as compared to the perceived color prior to addition of the photoluminescent fluorescent material, and wherein the excitation-altering photoluminescent fluorescent materials are selected from the group consisting of coumarins, styrylbenzenes, oxazoles, carbostyryls, stilbenes, and combinations thereof, and further wherein the emission color-altering fluorescent materials are selected from the group consisting of Xanthene type fluorescent dyes including rhodamine and fluorescene dyes, coumarin dyes, phenoxazone dyes including rifle red, nile blue, cresyl violet, phoenoxazoles styryl type dyes, Carbostyryl type dyes, Stilbene type dyes, and combinations thereof.

In another embodiment, the present invention is directed to the photoluminescent phosphorescent formulations comprising fluorescent materials wherein at least some of the photoluminescent fluorescent materials are excitation-altering photoluminescent fluorescent materials, wherein the excitation-altering photoluminescent fluorescent material is 1,4-Bis(2-methylstyryl)benzene, 7-amino-4-methylcoumrin, or combinations thereof.

In another embodiment, the present invention is directed to photoluminescent phosphorescent formulations comprising fluorescent materials or fluorescent materials in solution in the liquid carrier medium comprising photostabilizers that are Hindered Amine Light Stabilizers ("HALS") such as Tinuvin 292, Chimasorb 20202, or combinations thereof; hydroxyphenyl triazine UV absorbers such as Tinuvin 405; benzotriazole UV absorbers such as Timuvin 328; benzophenone type UV absorbers such as Chimassorb 81FL; or combinations thereof.

In another embodiment, the present invention is directed to a photoluminescent formulation comprising, by weight of the formulation: from about 33% to about 40% of photoluminescent phosphorescent materials, wherein said photoluminescent phosphorescent materials are selected from the group consisting H-13, H-14, green phosphor pigment, and blue phosphor pigment, and wherein said photoluminescent phosphorescent materials are uniformly distributed within said formulation; a liquid carrier medium comprising EGMME and MIBK, wherein EGMME is present in amount of about 28% to about 40%; an acrylic polymeric resin, wherein said acrylic polymeric resin is selected from the group consisting of NeoCryl B-818, NeoCryl B-735, NeoCryl B-813, and combinations thereof, and wherein the ratio of photoluminescent phosphorescent material to acrylic polymeric resin is from 1 to 2; a stabilizing additive, wherein said stabilizing additive comprises a dispersing agent that is DISPERBYK-180, DISPERBYK-181, DISPERBYK-108, or Tego Disperse 710, wherein said stabilizing additive is present in amount of about 1% to about 3%; a rheology modifier that is BYK-410 or BYK-411, wherein said rheology modifier is present in amount of about 1% to about 2%; a wetting agent that is Tego Wet 270 or Tego Wet 500 present in the amount of about 0.5% to about 2.5%; and a deaerator/defoamer that is Tego Airex 900, wherein said dearator/defoamer is present in amount of about 1% to about 3%.

In some of its object embodiments, the present invention is directed to photoluminescent objects comprising a preformed article and at least one photoluminescent phosphorescent layer which results from at least one of the foregoing formulations. In another object embodiment, the present invention is directed to photoluminescent objects comprising a preformed article, at least one photoluminescent phosphorescent layer which results from at least one of the foregoing formulations, and a least one reflective layer wherein said reflective layer results from a reflective formulation, wherein said photoluminescent layer is distal to said preformed article, wherein said reflective layer is proximal to said preformed article, and wherein said reflective layer is characterized by a reflectance such that the total emission from said object is greater than 80% relative to that of a white reflectance layer.

In another object embodiment, the present invention is directed to photoluminescent objects comprising a preformed article, at least one photoluminescent phosphorescent layer which results from at least one of the foregoing formulations, and at least one protective layer wherein said protective layer results from a protective formulation, wherein said protective layer is distal to said preformed article, wherein said photoluminescent layer is proximal to said preformed article, and wherein said protective layer has an FT of at least 95%.

In another object embodiment, the present invention is directed to photoluminescent objects comprising a preformed article, at least one photoluminescent phosphorescent layer which results from at least one of the foregoing formulations, and at least one protective layer wherein said protective layer results from a protective formulation, wherein said protective layer is distal to said preformed article, wherein said photoluminescent layer is proximal to said preformed article, wherein said protective layer has an FT of at least 95%, and wherein the protective layer further comprises photoluminescent fluorescent materials thereby resulting in a photoluminescent fluorescent protective layer.

In another object embodiment, the present invention is directed to photoluminescent objects comprising a preformed article, at least one photoluminescent phosphorescent layer which results from at least one of the foregoing formulations, and at least one protective layer wherein said protective layer results from a protective formulation, wherein said protective layer is distal to said preformed article, wherein said photoluminescent layer is proximal to said preformed article, wherein said protective layer has an FT of at least 95%, wherein the protective layer further comprises photoluminescent fluorescent materials, thereby resulting in a photoluminescent fluorescent protective layer, and wherein the protective layer further comprises photostabilizers.

In another object embodiment, the present invention is directed to photoluminescent objects comprising a preformed article, at least one photoluminescent phosphorescent layer which results from at least one of the foregoing formulations, and at least one protective layer wherein said protective layer results from a protective formulation, wherein said protective layer is distal to said preformed article, wherein said photoluminescent layer is proximal to said preformed article, wherein said protective layer has an FT of at least 95%, wherein the protective layer further comprises photoluminescent fluorescent materials or fluorescent materials in solution in the liquid carrier medium, thereby resulting in a photoluminescent fluorescent protective layer, or photoluminescent fluorescent materials and photostabilizers, wherein at least some of said photoluminescent fluorescent materials are excitation-altering photoluminescent fluorescent materials, wherein said excitation-altering photoluminescent fluorescent materials increase the luminous intensity of said photoluminescent object.

In another object embodiment, the present invention is directed to photoluminescent objects comprising a preformed article, at least one photoluminescent phosphorescent layer which results from at least one of the foregoing formulations, and at least one protective layer wherein said protective layer results from a protective formulation, wherein said protective layer is distal to said preformed article, wherein said photoluminescent layer is proximal to said preformed article, wherein said protective layer has an FT of at least 95%, and wherein the protective layer further comprises photoluminescent fluorescent materials or fluorescent materials in solution in the liquid carrier medium, thereby resulting in a photoluminescent fluorescent protective layer, and wherein at least some of said photoluminescent fluorescent materials are emission color-altering fluorescent materials, wherein said emission color-altering fluorescent materials alter the emission spectrum of said photoluminescent object to change the perceived color of said object as compared to the perceived color prior to addition of said photoluminescent fluorescent material.

In another object embodiment, the present invention is directed to photoluminescent objects comprising a preformed article, at least one photoluminescent phosphorescent layer which results from at least one of the foregoing formulations, and at least one protective layer wherein said protective layer results from a protective formulation, wherein said protective layer is distal to said preformed article, wherein said photoluminescent layer is proximal to said preformed article, wherein said protective layer has an FT of at least 95%, wherein the protective layer further comprises photoluminescent fluorescent materials or fluorescent materials in solution in the liquid carrier medium, thereby resulting in a photoluminescent fluorescent protective layer, or photoluminescent fluorescent materials and photostabilizers, wherein at least some of said photoluminescent fluorescent materials are excitation-altering photoluminescent fluorescent materials, wherein said excitation-altering photoluminescent fluorescent materials increase the luminous intensity of said photoluminescent object, and which further comprises emission color-altering fluorescent materials, wherein said emission color-altering fluorescent materials alter the emission spectrum of said photoluminescent object to change the perceived color of said object as compared to the perceived color prior to addition of said photoluminescent fluorescent material.

In another object embodiment, the present invention is directed to photoluminescent objects comprising a preformed article, at least one photoluminescent phosphorescent layer which results from at least one of the foregoing formulations, with or without photostablizers, and at least one protective layer wherein said protective layer results from a protective formulation, wherein said protective layer is distal to said preformed article, wherein said photoluminescent layer is proximal to said preformed article, wherein said protective layer has an FT of at least 95%, wherein the protective layer further comprises photoluminescent fluorescent materials, which may be soluble in the liquid carrier medium used for the photoluminescent fluorescent protective layer, thereby resulting in a photoluminescent fluorescent protective layer, and wherein at least some of said photoluminescent fluorescent materials alter the daylight color of said photoluminescent object compared to the daylight color without such materials.

In another object embodiment, the present invention is directed to photoluminescent objects comprising a preformed article, at least one photoluminescent phosphorescent layer which results from at least one of the foregoing formulations, and at least one protective layer wherein said protective layer results from a protective formulation, wherein said protective layer is distal to said preformed article, wherein said photoluminescent layer is proximal to said preformed article, wherein said protective layer has an FT of at least 95%, wherein the protective layer further comprises photoluminescent fluorescent materials or fluorescent materials in solution in the liquid carrier medium, thereby resulting in a photoluminescent fluorescent protective layer, or photoluminescent fluorescent materials and photostabilizers, wherein at least some of said photoluminescent fluorescent materials are excitation-altering photoluminescent fluorescent materials, wherein said excitation-altering photoluminescent fluorescent materials increase the luminous intensity of said photoluminescent object, and wherein the excitation-altering fluorescent materials are selected from the group consisting of coumarins, styrylbenzenes, oxazoles, carbostyryls, stilbenes, and combinations thereof.

In another object embodiment, the present invention is directed to photoluminescent objects comprising a preformed article, at least one photoluminescent phosphorescent layer which results from at least one of the foregoing formulations, and at least one protective layer wherein said protective layer results from a protective formulation, wherein said protective layer is distal to said preformed article, wherein said photoluminescent layer is proximal to said preformed article, wherein said protective layer has an FT of at least 95%, and wherein the protective layer further comprises photoluminescent fluorescent materials or fluorescent materials in solution in the liquid carrier medium, thereby resulting in a photoluminescent fluorescent protective layer, and wherein at least some of said photoluminescent fluorescent materials are emission color-altering fluorescent materials, wherein said emission color-altering fluorescent materials alter the emission spectrum of said photoluminescent object to change the perceived color of said object as compared to the perceived color prior to addition of said photoluminescent fluorescent material, and wherein said emission color-altering fluorescent materials are selected from the group consisting of Xanthene type fluorescent dyes including rhodamine and fluorescene dyes, coumarin dyes, phenoxazone dyes including nile red, nile blue, cresyl violet, phoenoxazoles styryl type dyes, Carbostyryl type dyes, Stilbene type dyes, and combinations thereof.

In another object embodiment, the present invention is directed to photoluminescent objects comprising a preformed article, at least one photoluminescent phosphorescent layer which results from at least one of the foregoing formulations, and at least one protective layer wherein said protective layer results from a protective formulation, wherein said protective layer is distal to said preformed article, wherein said photoluminescent layer is proximal to said preformed article, wherein said protective layer has an FT of at least 95%, wherein the protective layer further comprises photoluminescent fluorescent materials or fluorescent materials in solution in the liquid carrier medium, thereby resulting in a photoluminescent fluorescent protective layer, or photoluminescent fluorescent materials and photostabilizers, wherein at least some of said photoluminescent fluorescent materials are excitation-altering photoluminescent fluorescent materials, wherein said excitation-altering photoluminescent fluorescent materials increase the luminous intensity of said photoluminescent object, and which further comprises emission color-altering fluorescent materials, wherein said emission color-altering fluorescent materials alter the emission spectrum of said photoluminescent object to change the perceived color of said object as compared to the perceived color prior to addition of said photoluminescent fluorescent material, and wherein said excitation-altering photoluminescent fluorescent materials are selected from the group consisting of coumarins, styrylbenzenes, oxazoles, carbostyryls, stilbenes, and combinations thereof, and further wherein said emission color-altering fluorescent materials are selected from the group consisting of Xanthene type fluorescent dyes including rhodamine and fluorescene dyes, coumarin dyes, phenoxazone dyes including nile red, nile blue, cresyl violet, phoenoxazoles styryl type dyes, Carbostyryl type dyes, Stilbene type dyes, and combinations thereof.

In another object embodiment, the present invention is directed to photoluminescent objects comprising a preformed article, at least one photoluminescent phosphorescent layer which results from at least one of the foregoing formulations, and at least one protective layer wherein said protective layer results from a protective formulation, wherein said protective layer is distal to said preformed article, wherein said photoluminescent layer is proximal to said preformed article, wherein said protective layer has an FT of at least 95%, wherein the protective layer further comprises photoluminescent fluorescent materials or fluorescent materials in solution in the liquid carrier medium, thereby resulting in a photoluminescent fluorescent protective layer, or photoluminescent fluorescent materials and photostabilizers, wherein at least some of said photoluminescent fluorescent materials are excitation-altering photoluminescent fluorescent materials, wherein said excitation-altering photoluminescent fluorescent materials increase the luminous intensity of said photoluminescent object, and wherein said excitation-altering fluorescent materials are selected from the group consisting of 1,4-Bis(2-methylstyryl)benzene, 7-amino-4-methylcoumrin, and combinations thereof.

In other object embodiments, the photostabilizers used are Tinuvin 292, Tinuvin 405, Chimasorb 20202, Timuvin 328, or combinations thereof.

In other embodiments, the present invention is directed to methods for creating a photoluminescent object, said methods comprising the steps of obtaining a preformed article and applying to said preformed article at least one of the photoluminescent formulations described above.

In another method embodiment, the present invention is directed to methods for creating a photoluminescent object, said methods comprising the steps of obtaining a preformed article, applying to said preformed article at least one of the photoluminescent formulations described above, and applying to said preformed article at least one reflective formulation, wherein said photoluminescent layer is distal to said preformed article, wherein said reflective layer is proximal to said preformed article, and further wherein said reflective layer is characterized by a reflectance such that the total emission from said object is greater than 80% relative to that of a white reflectance layer.

In another method embodiment, the present invention is directed to methods for creating a photoluminescent object, said methods comprising the steps of obtaining a preformed article, applying to said preformed article at least one of the photoluminescent formulations described above, and applying to said preformed article at least one protective formulation, wherein said protective layer is distal to said preformed article, wherein said photoluminescent layer is proximal to said preformed article, and wherein said protective layer has an FT of at least 95%.

In another method embodiment, the present invention is directed to methods for creating a photoluminescent object, said method comprising the steps of obtaining a preformed article, applying to said preformed article at least one reflective formulation, applying to said preformed article at least one photoluminescent formulation, and applying to said preformed article at least one protective formulation, wherein said reflective layer is proximal to said preformed article, wherein said protective layer is distal to said preformed article, and wherein said photoluminescent layer is between said reflective and protective layers.

The preformed article in the foregoing object and method embodiments include a pathway, a pathmarker, pathway lighting, all forms of signage, an outdoor décor item, an outdoor statue, an outdoor figurine, outdoor lighting, an outdoor ornament, outdoor tree hanging paraphernalia, marine items, a boat, a buoy, instrumentation, safety gear, a helmet, a hard hat, a vest, sporting equipment, a basket ball, a tennis ball, a golf ball, a golf ball core, a golf ball cover, a baseball, a racquet ball, a glove, an arm protector, a knee protector, a shoulder protector, a backboard, a sports net, recreational equipment, a swimming pool, a side of a swimming pool, the rim of a swimming pool, the bottom of a swimming pool, a holiday decoration, a candle, a floor, an umbrella, an automobile, a wall, a stairway, an individual stair, a sidewalk, a street, a doll, or a toy.

Selection of Binder Resin and Associated Solvent System

It is important to select only those polymeric binder resins for the photoluminescent phosphorescent materials that do not absorb electromagnetic radiation within the excitation spectrum of the chosen photoluminescent phosphorescent material. This is important, for otherwise, the excitation of the photoluminescent material will be inhibited. It is also desirable that the chosen polymeric material should have minimal impact on the luminous intensity, that is, it should not exhibit any significant quenching of the photoluminance.

Also, the liquid carrier medium can be any solvent other than water. In selecting the liquid carrier medium, for cases wherein the polymer is soluble in said liquid carrier medium, the polymeric solution should be clear and should not exhibit any haze, otherwise, luminous intensity transmission will be adversely impacted. In general, highly polar solvents will increase the likelihood of emissions, and hence should, in general, be avoided.

Selection of Dispersing Agents

High mechanical forces are necessary to incorporate solids in liquid media. It is customary to employ "dispersing agents" in order to reduce these dispersion forces and in order to keep the total energy input into the system, which is necessary for deflocculating the solid particles and thus the time of dispersion, as low as possible. These dispersing agents are surface-active substances of anionic, cationic, or neutral structure. These substances are added in a small amount, either directly to the solid or to the dispersion medium. Furthermore, it is known that even after complete deflocculation of the solid agglomerates into primary particles, re-agglomeration occurs after the dispersion process. In such a case, the effort expended to produce dispersion is partially or completely negated. Agglomeration in photoluminescent formulations can cause degradation in the luminous intensity and persistence either as resulting from incomplete excitation or due to scattering. The higher the level of agglomeration, the higher will be the number of photoluminescent phosphorescent particles with a partial or no charge.

The consequences of an unstable dispersion or of re-agglomeration can also result in a rough or non-uniform surface that can further scatter electromagnetic radiation thereby further diminishing the luminous intensity and persistence.

There is a multiplicity of different substances which are used nowadays as dispersing agents for pigments and extenders. A review of the existing patent literature is given in European Patent No. 0 318 999 (See, e.g., Page 2, Lines 24-26). Apart from very simple, low molecular weight compounds such as lecithin, fatty acids, and salts thereof, and alkylphenol ethoxylates, for example, complex structures are also used as dispersing agents. In particular, these comprise amino- and amide-functional systems, which are widely-used amongst dispersing agents. In British Patent No. 2 153 804, for example, amino- and amide-functional poly- and oligo-copolymers based on polyamines and polycaprolactones are used for the dispersion of magnetic pigments. European Patent No. 0 713 894 describes the use of amino-functional polylactones for coatings and printing inks. Moreover, amine-functional polyacrylates, such as those disclosed in European Patent No. 0 311 157 and in U.S. Pat. No. 3,980,602 are used for the stabilization of organic and inorganic pigments. Amine-functional polymers based on polyisocyanates constitute a further group. See, e.g., European Patent Nos. 0 159 678 and 0 438 836.

Derivatives of phosphoric acid esters are also frequently used as dispersing agents. European Patent No. 0 417 490 (see Page 2, Lines 23-43) gives a summary of the use of these substances, preferably as dispersing agents or for the pretreatment of pigments. The salts of acidic phosphoric acid esters are also described in this patent. Inorganic bases as well as mono- and di-amines are listed as the basic salt formation components.

Low-Viscosity Prevents Mechanically-Induced Degradation of Photoluminescent Phosphorescent Particles While satisfactory stabilization of pigments or solids can be achieved with one or more of the dispersing aids cited above, many of these dispersing agents have an insufficient capacity for reducing the viscosity on the incorporation of pigments or of solid particles in binder vehicles. For manufacturing photoluminescent objects, there is a need to minimize the thickness of the photoluminescent phosphorescent layers. There is also a strong desire to reduce the amount of solvent as far as possible (e.g., high-solids formulations). All of this can lead to high viscosity with the resulting need for the application of excessive energy to disperse the photoluminescent phosphorescent material, which is undesirable. To summarize, excessive viscosity buildup will require applying excessive energy, which in turn will cause degradation of luminous intensity of the photoluminescent phosphorescent formulations.

Examples of suitable dispersing aids that minimize agglomeration and successfully minimize viscosity buildup, that is, require very low levels of energy for pigment dispersion, include acrylic acid-acrylamide polymers such as those cited in U.S. Pat. No. 6,596,816, incorporated herein by reference for all purposes, or salts of an amine functional compound and an acid, such as those cited in U.S. Pat. No. 6,111,054, also incorporated herein by reference for all purposes.

Selection of Rheology Modifiers

"Rheology Modifiers" are those substances which generally can build viscosity in liquid dispersion formulations, thereby retarding settling of pigment materials while at the same time significantly lowering viscosity upon application of shear, to enhance smooth applicability of such formulations onto articles. There is a widespread practice of using materials such as colloidal silica, or fumed silica, and magnesium aluminum silicate clays, such as bentonite, not only as thixotropic modifiers to prevent sagging and running of luminescent formulation as it is applied to preformed articles, but also as suspending fillers, that is, for minimizing settling of dense pigment particles such as phosphor particles. See, e.g., U.S. Pat. No. 6,207,077. It should be noted that settling in the photoluminescent formulation or as the applied formulation dries to a film to form a photoluminescent layer is undesirable as it will result in a lowering of luminous intensity.

The common practice is to use organically-modified bentonites, silicas, hydrogenated castor oil, and polyamide waxes. A disadvantage of these substances is that they are mostly dry solids which have to be brought into the form of a semi-finished product using solvents and shear forces, and incorporated into the liquid coating system under careful temperature control. Failure to observe such temperatures results in crystallites in the finished coating system, which may not only lead to defects in the coating, but also cause scattering and hence a reduction in the luminous intensity.

The bigger disadvantage of their use in photoluminescent formulations and coatings to create photoluminescent layers is that they lead to turbidities and haze rather than transparent coatings, which, of course, will result in scattering of photoluminescent emissions and hence a lowering of the luminous intensity and persistence. Additionally, handling dry pulverulent products which give rise to dusts in the course of processing is undesirable. For these reasons their use as rheology modifiers is undesirable.

The present invention employs polymeric urea-urethanes in aprotic polar solvents as rheology modifiers. This class of rheology modifiers can be used satisfactorily, that is, without scattering of electromagnetic radiation, and without excessive build up of viscosity. Use of these rheology modifiers not only minimizes settling of the dense pigment particle, minimizes sagging and runnability of the formulations as applied to preformed articles, as well as assists in leveling, thereby resulting in more uniform photoluminescent layers. Examples of such urea-urethanes can be found, for example, in U.S. Pat. No. 6,617,468 and U.S. Pat. No. 6,870,024, incorporated herein by reference for all purposes.

Selection of Wetting Agents

If the photoluminescent formulation does not contain "wetting agents," also known as leveling agents, the surface of the resulting layer upon application to an article may not be smooth. Instead, the surface may be structured, such as having a wavy surface or as having an orange peel-like surface. These surfaces may be finely structured, with a short wave, or coarsely structured, with a long wave.

This waviness is unwanted not only because the surface is not visually appealing with a lowered market appeal, but, more importantly, any surface structure is likely to cause scattering of electromagnetic radiation and loss of luminous intensity.

Known examples of such agents are poly(meth)acrylates and polysiloxanes, which may be used as leveling promoters for coatings. In the case of the polysiloxanes, the compounds generally comprise polydimethylsiloxanes, polymethylalkylsiloxanes, or else polyether- or polyester-modified polydimethyl- or polymethylalkylsiloxanes. In the case of the poly(meth)acrylates, preference is given to the use of polymers or copolymers of alkyl acrylates having an alkyl radical chain length of $C_2$-$C_8$, such as ethyl acrylate, 2-ethylhexyl acrylate, or n-butyl acrylate, for example. The products used possess in some cases molecular weights of up to 100,000.

The action of all these products is based on surface activity at the liquid/gas interface: owing to a certain incompatibility with the actual binder of the coating system, these products adopt an orientation to the interface. This incompatibility may be increased by raising the molecular weight of these polymers. A disadvantage then, however, is that owing to this incompatibility there can be cases wherein the scattering of electromagnetic radiation or haze of the layer becomes high, thereby resulting in significant reduction in luminous intensity.

The present invention employs branched polymers comprising a free-radically or ionically polymerized base molecule into which monoethylenically unsaturated macromonomeric units have been incorporated by copolymerization. Examples of such polymers may be found in U.S. Pat. No. 6,710,127, incorporated herein by reference for all purposes.

Other Additives

Other additives, such as "deaerators" and "defoamers" may be employed. Deaerators are those substances which minimize entrained air. Defoamers are those substances that allow easier dissipation of entrained air. Depending upon the materials comprising the formulation and the resultant viscosity, a significant amount of air entrainment can cause scattering of electromagnetic radiation and, hence, a reduction in luminous intensity.

The following tables and examples are offered to illustrate the present invention and should not be construed in any way as limiting the scope of this invention.

TABLES AND EXAMPLES

Table 1 provides the material type, commercial designation, and supplier of materials suitable for use in the invention.

TABLE 1

Material Sourcing

| Material Type | Commercial Designation(s) | Supplier(s) |
|---|---|---|
| Photoluminescent Phosphorescent Formulation | Premium Polymer Emulsion Glow Paint | Ready Set Glo, Manitoba Canada |
| Photoluminescent Phosphorescent Formulation | China Green Paint | ACTCO Ltd., Taipei, Taiwan |
| Photoluminescent Phosphorescent Material | Green Phosphor Pigment | Sun-Up Products Inc of Danvers, MA |
| Photoluminescent Phosphorescent Material | Lumilex Green | Honeywell Morristown, NJ |
| Photoluminescent Phosphorescent Material | Ultra Green | Glow Inc. Severn, MD |
| Photoluminescent Phosphorescent Material | H13, H14 | Capricorn Chemicals, Ely, Cambs., England |
| Dispersing Agent, Formulation Stabilizing Additive | DISPERBYK-180 | BYK Chemie U.S.A., of Walllingford, CT |
| Rheology Modifier, Formulation Stabilizing Additive | BYK-410 | BYK Chemie U.S.A., of Walllingford, CT |
| Wetting Agent, Performance Enhancing Additive | TEGOWET-270 | Tego Coating & Ink Additives of Hopewell, VA |
| Deaerator, Performance Enhancing Additive | TEGOAIREX-900 | Tego Coating & Ink Additives of Hopewell, VA |
| Polymeric Resin | NeoCryl B-818 | Neo Resins Inc Of Wilmington, MA |
| Liquid Carrier Medium | Ethylene Glycol Mono Methyl Ether EGME | Solvent Supplier |
| Liquid Carrier Medium | Methyl Iso Butyl Ketone MIBK | Solvent Supplier |

Table 2 provides the composition of formulations used in the following examples. "PF" refers to photoluminescent formulations.

TABLE 2

Composition of Formulations

| Formulation Type | Example Number(s) | Material | Weight % |
|---|---|---|---|
| PF-1 | 13 | China Green Paint | Commercial Formulation from Actco Ltd. |
| PF-2 | 2 | Premium Polymer Elumsion Glow Paint | Commercial Formulation from Ready Set Glow |
| PF-3 | 3, 7 | Green Phosphor Pigment | 38.01% |
| PF-3 | 3, 7 | Polymeric Resin NeoCryl B-818 | 23.66% |
| PF-3 | 3, 7 | Dispersing Agent DISPERBYK-180 | 1.60% |

TABLE 2-continued

Composition of Formulations

| Formulation Type | Example Number(s) | Material | Weight % |
|---|---|---|---|
| PF-3 | 3, 7 | Rheology Modifier BYK-410 | 1.14% |
| PF-3 | 3, 7 | Wetting Agent TEGOWET-270 | 1.02% |
| PF-3 | 3, 7 | Deaerator TEGOAIREX-900 | 0.66% |
| PF-3 | 3, 7 | Liquid Carrier Medium EGME | 18.85% |
| PF-3 | 3, 7 | Liquid Carrier Medium MIBK | 15.05% |
| PF-4 | 8 | Green Phosphor Pigment H13 | 38.01% |
| PF-4 | 8 | All Other addenda as in PF-3 (other than the Green Phosphor Pigment, cited above) | Other addenda Wt % as in PF-3 |
| PF-5 | 12 | Green Phosphor Pigment H13 | 38.01% |
| PF-5 | 12 | Polymeric Resin NeoCryl B-735 | 23.66% |
| PF-5 | 12 | All Other addenda as in PF-3 | Other addenda Wt % as in PF-3 |

Example 1

Three formulations, PF-3, PF-4, and PF-5, were prepared according to Table 2. Formulation PF-3 was utilized to illustrate the selection of a dispersing agent according to the selection criteria presented above. Formulation PF-4 was utilized to illustrate the adverse impact of rheology modifiers/suspending fillers that exist in a solid state in the liquid carrier medium. Formulation PF-5 was prepared using a different polymeric resin. It will be shown below that the formulations PF-3, PF-4, and PF-5 prepared according to this invention exhibit significantly higher luminous intensity. Data from these three formulations are presented below.

Examples 2 and 13

Figure 11:
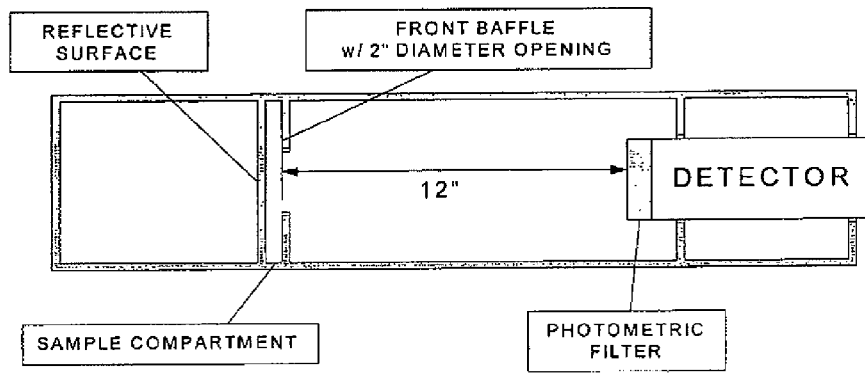
FIG. 11 is a stylized description of the Luminous Intensity measurement apparatus.

Photoluminescent phosphorescent layer of Example 2 resulted from commercial green photoluminescent phosphorescent formulation obtained from ACTCO, Ltd. of Taipei, Taiwan. The photoluminescent phosphorescent layer of Example 13 resulted from photoluminescent phosphorescent formulation obtained from Ready Set Glow. Luminous data from the photoluminescent layers are presented below.
Luminous Intensity Measurement Luminous Intensity measurements were performed according to the apparatus set up described in FIG. 11. The luminous intensity measurements were performed on a photoluminescent layer on a white reflective substrate. The reported data are normalized for layer thickness and hence, the reported luminous intensity measurements in mcd/meter$^2$ are presented for a layer of one-thousandth of an inch (a "mil", or 25 micron thickness).

Samples were charged by exposure to a 600 watt UV/visible light source (UV Wash, Elation Lighting, Los Angeles, Calif.) for 10 minutes. The samples were then immediately inserted into the emission measuring apparatus described in FIG. 11. A 2 inch circular aperature (12.57 square inches) is placed between the sample and detector with a 12 inch distance between the sample and detector. Emission was measured over a period of 30 minutes after exposure. The high gain photometric detector is connected to the IL1700 photometer (International Light, Inc).
Film Transmission Measurement ("FT")

Transmission measurement of films coated on clear 5 mil Mylar base were performed using a Greytag Spectrolino spectrophotometer in reflectance measuring mode. The sample to be analyzed was placed on a white reflective layer and reflectance was measured between 510 and 550 nm. Percent transmission was calculated relative to the transmission of a clear mylar base without any coated films.

Photoluminescent phosphorescent formulations of high luminous intensity can only result from ensuring that the photoluminescent phosphorescent material is uniformly distributed in the liquid carrier medium, does not exhibit agglomeration and settling, either as a formulation or as a layer on an article. Further, any materials likely to exist in a solid state in the formulation can scatter electromagnetic radiation, and therefore reduce luminous intensity. Such materials should therefore be at least minimized, but preferably avoided. Such materials can be electromagnetic radiation-scattering pigments, such as $TiO_2$ or other absorptive colorant pigments to enhance daylight color, or suspending fillers such as silica powder or clays, etc.

For the reasons cited above, this invention does not utilize absorptive pigment colorants in photoluminescent phosphorescent formulations to modify and/or enhance daytime color of photoluminescent phosphorescent layers or photoluminescent fluorescent layers or protective layers comprising photoluminescent fluorescent materials.

Furthermore, all of the formulation stabilizing additives, such as dispersants and rheology modifiers, as well as the performance-enhancing additives, such as wetting agents, deaerators, etc. are selected so as to minimize scattering of electromagnetic radiation and use of excessive energy so that luminous intensity of photoluminescent layer is maximized.

Examples 4, 5, 6, and 7

Examples 4, 5, 6, and 7 are based on photoluminescent layers resulting from formulation PF-3 with none to varying dispersing agents. Table 3 provides dispersant selection data for maximizing luminous intensity of a green phosphor powder supplied by Sun Up Products of Danvers, Mass.

TABLE 3

Dispersing Agent Impact On Luminous Intensity

| Elapsed Time After Cessation of Excitation In Minutes | Example 4 (Formulation See Below) No Dispersing Agent Stabilizing Additive Luminous Intensity mcd/meter$^2$ | Example 5 (Formulation See Below) Dispersing Agent Stabilizing Additive DISPERBYK -108 Luminous Intensity mcd/meter$^2$ | Example 6 (Formulation See Below) Dispersing Agent Stabilizing Additive Tego Disperse -710 Luminous Intensity mcd/meter$^2$ | Example 7 Formulation PF-3 Luminous Intensity mcd/meter$^2$ |
|---|---|---|---|---|
| 2 Minutes | 117.31 | 120.96 | 128.09 | 130.47 |
| 4 Minutes | 61.73 | 63.38 | 66.94 | 68.47 |

TABLE 3-continued

Dispersing Agent Impact On Luminous Intensity

| Elapsed Time After Cessation of Excitation In Minutes | Example 4 (Formulation See Below) No Dispersing Agent Stabilizing Additive Luminous Intensity mcd/meter$^2$ | Example 5 (Formulation See Below) Dispersing Agent Stabilizing Additive DISPERBYK-108 Luminous Intensity mcd/meter$^2$ | Example 6 (Formulation See Below) Dispersing Agent Stabilizing Additive Tego Disperse-710 Luminous Intensity mcd/meter$^2$ | Example 7 Formulation PF-3 Luminous Intensity mcd/meter$^2$ |
|---|---|---|---|---|
| 6 Minutes | 41.99 | 43.09 | 45.49 | 46.43 |
| 8 Minutes | 31.74 | 32.55 | 34.26 | 35.03 |

In Example 4, the formulation used is PF-3 minus the addition of any dispersing agent. In Example 5, the formulation used is PF-3 with the dispersing agent being DISPEWR-BYK-108. In Example 6, the formulation used is PF-3 with the dispersing agent being Tego Disperse-710.

Thus it can be seen that whereas use of DISPERSYK 108 results in a small increase in luminous intensity for the selected phosphor, DISPERBYK-180 can result in a luminous intensity gain of approximately 11%, compared to the case wherein no dispersing agent is used. It should be noted that we have not reported data for dispersants which resulted in badly agglomerated preparations. Even though all of these dispersants resulted in formulations that looked uniform visually they caused differences in luminous intensity.

Examples 8, 9, 10, and 11

Examples 8, 9, 10, and 11 are based on photoluminescent layers resulting formulation PF-4 as described in Table 2. These examples serve to illustrate the adverse impact on luminous intensity resulting from the use of rheology modifiers/suspending fillers that exist in the solid state in the liquid carrier medium. We begin by first presenting film transmissivity (FT) data in Table 4. We will then show in Table 5 that luminous intensity data generally track the FT data and hence can serve as a useful guide for screening rheology modifiers.

TABLE 4

Impact of Light Scattering Rheology Modifiers On Film Transmission

| | Rheology Modifier BYK-410 | Rheology Modifier Garamite | Rheology Modifier Silica | Rheology Modifier Alumina at 5% |
|---|---|---|---|---|
| Transmission Through 2 Mil Thick Film (FT %) | 99.12% | 94.17% | 95.38% | 94.17% |

TABLE 5

Impact of Light Scattering Rheology Modifiers On Luminous Intensity

| Elapsed Time After Cessation of Excitation In Minutes | Example 8 PF-4 Formulation Rheology Modifier BYK-410 (mcd/m$^2$) | Example 9 (Formulation See Note Below) Rheology Modifier Garamite (mcd/m$^2$) | Example 10 (Formulation See Note Below) Rheology Modifier Silica (mcd/m$^2$) | Example 11 (Formulation See Note Below) Rheology Modifier Alumina (mcd/m$^2$) |
|---|---|---|---|---|
| 2 Minutes | 162.77 | 145.47 | 142.36 | 134.53 |
| 4 Minutes | 84.92 | 75.85 | 74.00 | 69.06 |
| 6 Minutes | 58.00 | 51.51 | 50.18 | 46.79 |
| 8 Minutes | 44.00 | 39.06 | 38.00 | 35.28 |

In Example 9, the formulation used is as in PF-4 with the BYK-410 being replaced by Garamite clay at 5% sourced from Southern Clay Products of Texas. In Example 10, the formulation used is as in PF-4 with the BYK-410 being replaced by Silica Powder, Cabosil PS-720 at 5%. In Example 11, the formulation used is PF-4 with the BYK-410 being replaced by alumina oxide from Alfa Aesar at 0.5% (20-50µ.

It can be seen from Table 4 that FT measurements, that is, transmission measurements in a non-phosphorescent layer as defined above, is a good way to screen the impact of the additives. This is validated in Table 5 with a measurement of Luminous Intensity. Depending on the additive, there is a decrease in Luminous Intensity of approximately between 11 and 20%. Of course, addition of higher amounts as reported in prior art will lead to even greater losses.

Examples 3, 8, and 12

Examples 3, 8, and 12 illustrate photoluminescent formulations according to this invention together with comparative examples of commercial applications.

TABLE 6

Comparison of Luminous Intensity Of Photoluminescent Phosphorescent Layers According to this Invention with Commercial Materials

| Elapsed Time After Cessation of Excitation In Minutes | Example 3 Formulation PF-3 (mcd/m²) | Example 8 Formulation PF-3 (mcd/m²) | Example 12 Formulation PF-5 (mcd/m²) | Example 2 Commercial Formulation Ready Set Glo (mcd/m²) | Example 13 Commercial Formulation China Paint (mcd/m²) |
| --- | --- | --- | --- | --- | --- |
| 2 Minutes | 130.47 | 162.77 | 172.39 | 81.02 | 81.27 |
| 4 Minutes | 68.47 | 84.92 | 89.30 | 41.59 | 42.45 |
| 6 Minutes | 46.43 | 58.00 | 60.00 | 28.18 | 28.73 |
| 8 Minutes | 35.03 | 44.00 | 45.07 | 21.25 | 21.76 |

Thus, our first object in the preparation of photoluminescent materials is to select the polymeric resin and its solvent system together with the dispersants, rheology modifier and wetting agent (comprising the stabilizing additive package), to be used for creating a uniform homogeneous photoluminescent phosphorescent particle liquid dispersion, such that when all of these materials, that is the polymeric resin and its solvent system together with the stabilizing additives are coated onto a 50 micron transparent film, they are characterized by a visible electromagnetic radiation transmission of greater than 95%.

The next step is to gently add the photoluminescent phosphorescent pigment powder to the liquid mixture comprising polymeric resin and its solvent system, together with the stabilizing additives described above under slow agitation. With the proper selection of the ingredients according to the criterion discussed earlier and the addition of photoluminescent phosphorescent particles under low shear one can successfully create a dispersion free of agglomeration and which will result in high luminous intensity formulations and as applied onto articles with a reflectance layer having high reflectivity as described above will also result in photoluminescent objects of high luminous intensity as seen in Examples 3, 8, and 12.

Use of Photoluminescent Fluorescers to Increase Luminous Intensity and Persistence We have found that when certain Photoluminescent fluorescing materials (Ultra Violet absorbers) are chosen so that their emission has at least a partial overlap with the absorption of photoluminescent phosphorescent materials, surprisingly result in an increase in the luminous intensity.

Alkaline earth photoluminescent materials generally have an excitation band in the range of 365 to 400 nm. Even though many excitation sources such as sunlight have adequate energy in this spectrum, it has been surprisingly found that the additional incorporation of Photoluminescent fluorescent materials, such as described above, results in emissions of higher intensity.

It appears that the use of UV absorbers that absorb the shorter wavelength UV spectrum to reemit in the longer wavelength UV spectrum, thereby resulting in a greater amount of the photoluminescent phosphorescent material excitation energy in the longer wavelengths, in turn may result in greater efficiency of emission with a corresponding increase in luminous intensity and persistence.

Example 14

Example 14 is a photoluminescent layer resulting from the incorporation of a photoluminescent fluorescent material in formulation PF-3.

TABLE 7

Increase in Luminous Intensity With Excitation-Altering Fluorescent Material

| Elapsed Time After Cessation of Excitation In Minutes | Example 3 Formulation PF-3 mcd/m² | Example 14 Formulation PF-3 with addition of Fluorescent Material | Photoluminescent Fluorescent Material added |
| --- | --- | --- | --- |
| 2 Minutes | 130.47 | 174.50 | 1,4-bis(2-methyl- |
| 4 Minutes | 68.47 | 86.05 | styryl) benzene |
| 6 Minutes | 46.43 | 57.20 | added to protective |
| 8 Minutes | 35.03 | 42.60 | overcoat at 0.5% |

Emission Color-Altering Fluorescent Materials

The emission color of the photoluminescent phosphorescent layers or objects can be altered by the addition of certain fluorescing compounds to the photoluminescent phosphorescent layer or to the protective layer above it. Key properties of these fluorescing compounds is that their spectral absorption overlaps the spectral emission of the phosphor and that the fluorescing compounds have minimal spectral absorption in the region in where the phosphor charges. FIG. 12A shows the emission spectra of the photoluminescent phosphorescent layers resulting from PF-4 formulations with and without the addition of emission color altering fluorescing compounds.

Similarly, FIG. 12B shows the emission spectra of the photoluminescent phosphorescent layers resulting from PF-4 formulations wherein the photoluminescent phosphorescent material H-13 is substituted by H-14, with and without the addition of emission color altering fluorescing compounds Referring to FIG. 12, in the first graph, FIG. 12A, the green phosphor emission of photoluminescent layer, curve (1), can be shifted to yellow or light orange by adding 0.005% w/w % (on photoluminescent phosphorescent material) rhodamine 6G to Formulation PF-4, curves (2) and (3), respectively. The net color emission is a result of the combined emissions of the fluorescent compound and any remaining emission (not absorbed by the fluorescent compound) of the phosphorescent material. Curve (4) is the emission curve for a photoluminescent phosphorescent layer resulting from addition of 0.015% w/w % (on photluminescent phosphorescent material) sulfarhodamine B to Formulation PF-4, and curve (5) is the emission of a photoluminescent phosphorescent layer resulting from addition of 0.024% w/w % (on photoluminescent phosphorescent material) rhodamine 6G and 0.006% w/w % sulfarhodamine B to formulation PF-4. The resulting emission colors are light pink and reddish orange, respectively.

Again referring to FIG. 12, FIG. 12B shows the impact addition of photoluminescent fluorescent materials on the emission of a photoluminescent phosphorescent layer resulting from formulation PF-4 with phosphorescent material H-13 substituted by H-14.

Photolytic Stability of Photoluminescent Fluorescers to Alter Exciting Radiation The photoluminescent fluorescent compounds selected to enhance the luminous intensity and persistence of photoluminescent phosphorescent materials can be subject to photolytic degradation and may additionally require the use of photostabilizers to retard the photolytic degradation.

The following prophetic examples, A-D, serve to illustrate the invention with regard to retarding the photodegradation of the photoluminescent fluorescent compounds as set forth above.

Example A

The addition of Tinuvin 292 HP (HALS) (1-3 wt %) to a PF-4 formulation containing 0.5 wt % of the fluorescing compound 1,4-bis(2-methystyrl)benzene will reduce by 50% the photodegradation of said fluorescing compound arising from 10,000 foot candle solar exposure for 48 hours.

Example B

The addition of Chimassorb 2020 (HALS) (1-3 wt %) to a PF-4 formulation containing 0.5 wt % of the fluorescing compound coumarin 120 will reduce by 25% the photodegradation of said fluorescing compound arising from 10,000 foot candle solar exposure for 48 hours.

Example C

The addition of Chimmassorb 2020 (HALS) plus the addition of 0.01 to 0.1 wt % of a UV absorber of either the benzotriazole, benzophenone, or hydroxyphenyl triazine class to a PF-4 formulation containing 0.5 wt % of the fluorescing compound coumarin 120 will reduce by 50% the photodegradation of said compound arising from 10,000 foot candle solar exposure for 48 hours.

Example D

The addition of a 0.01 to 0.1 wt % of a UV absorber of either the benzotriazole, benzophenone, or hydroxyphenyl triazine class to a PF-4 formulation containing 0.05 wt % of the fluorescing compound nile blue perchlorate will reduce by 50% the photodegradation of said compound arising from 10,000 foot candle solar exposure for 48 hours.

Reflective Layer

The brightness of the photoluminescent phosphorescent layer is a function the reflectance of the underlying surface of the article to which a photoluminescent formulation is applied to create a photoluminescent layer. Article surfaces can vary widely in their properties and can result in significant absorption or minimum reflection of emission that is incident upon such a surface. The creation of a reflective layer with high reflectance of photoluminescent emission onto which is then applied is a photoluminescent phosphorescent layer can then serve to ensure high luminous intensity.

More specifically, the important property of the reflective layer is the reflectance in the wavelength region where the photoluminescent phosphorescent layer emits. In general, the photoluminescent phosphorescent layer emits 50% of its radiation toward the viewer and 50% of its radiation toward the reflective layer. If the reflective layer reflects 100% of the emission from the photoluminescent phosphorescent layer, the net emission reaching the view would be 100%, assuming no other losses such as those from scattering. If the reflective layer reflects 0% of the emission from the photoluminescent phosphorescent layer, the net emission reaching the viewer would be 50% (50% radiation emitted directly at the viewer+ 0% reflected by the reflected layer). If the reflective layer reflects 50% of the emission, the net emission reaching the viewer is 75% (50% directly emitted at the viewer+0.5*50% reflected or 25%). Table 8, below, shows net impact of reflective layer reflectance on net emission reaching the viewer.

TABLE 8

| Net Impact of Reflective Layer Reflectance On Net Emission Reaching the Viewer | | | |
|---|---|---|---|
| Reflective Layer Reflectance | % Emission From Reflective Layer | Net Emission Emitted Direcly at Viewer | Total Emission reaching viewer |
| 100% | 50% | 50% | 100% |
| 75% | 37.5% | 50% | 87.5% |
| 50% | 25% | 50% | 75% |
| 25% | 12.5% | 50% | 62.5% |
| 0% | 0% | 50% | 50% |

To illustrate this, a photoluminescent phosphorescent layer coated on a clear base was placed on top of reflective layers of different colors (based on the MacBeth Color Checker) and the net emission was measured as a function of the reflective color. The following graph shows the reflectance spectra of the colors evaluated The emission curve for the photoluminescent phosphorescent layer containing a green phosphor is overlayed on the graph, FIG. 13A, to illustrate the region where high reflectance is most important. FIG. 13B shows the emission spectra of the photoluminescent phosphorescent layer with different colored reflective layers.

The following table, Table 9, shows the actual integrated emission of the photoluminescent phosphorescent layer relative to the white reflective layer. The table also shows the % reflectance that is weighted based on the emission curve of the phosphor which was used to predict emission % relative to the white reflector layer.

|  | white | green 1 | green 2 | green 3 | black | magenta | cyan | bluish green |
|---|---|---|---|---|---|---|---|---|
| Actual Emission % relative to White | 100.00% | 81.08% | 62.32% | 63.17% | 52.14% | 55.73% | 64.89% | 83.54% |

The objective in choosing an appropriate reflective layer to be used for a given photoluminescent phosphorescent layer is of course, maximize the luminous intensity but also to permit flexibility of reflective layer colors. Given this objective, for reflective layers according to this invention, the goal is to have a total emission greater than 80% relative to that of a white reflectance layer as defined above. It can then be seen from the table above that for the photoluminescent formulation selected (PF-4), this is achieved for reflective layers that are white, green one, and bluish green.

The invention claimed is:

1. A photoluminescent formulation comprising:
   an effective amount of a phosphorescent material;
   a liquid carrier medium;
   a polymeric resin;
   a formulation stabilizing additive comprising at least a rheology modifier, said formulation stabilizing additive being dissolved in said liquid carrier medium; and
   another effective amount of a fluorescent material, said fluorescent material being a primary emission altering fluorescent material having spectral absorption that is minimal in a spectral region where the phosphorescent charges and overlaps spectral emission of at least some of the phosphorescent material;
   wherein the phosphorescent material is substantially uniformly distributed within the formulation; an emission spectrum of the photoluminescent formulation prior to the addition of the fluorescent material constituting a primary emission; the primary emission resulting in a perceived color; said fluorescent material alters the perceived color.

2. The photoluminescent formulation of claim 1, wherein the fluorescent material is in solution in the liquid carrier medium.

3. The photoluminescent formulation of claim 1, wherein the phosphorescent material is selected from the group consisting of alkaline-earth aluminates, alkaline-earth silicates, alkaline-earth aluminosilicates, and combinations thereof.

4. The photoluminescent formulation of claim 1, wherein the phosphorescent material comprises at least one metal oxide aluminate activated by europium and at least one coactivator selected from the group consisting of dysprosium, lanthanum, cerium praseodymium, neodymium, samarium, gadolinium, holmium, erbium, thulium, ytterbium, lutetium, tin, manganese, and bismuth, and wherein the metal is one or more of strontium, calcium, magnesium, and barium.

5. The photoluminescent formulation of claim 1, wherein the polymeric resin is selected from the group consisting of acrylates, polyvinyl chlorides, polyurethanes, polycarbonates, polyesters, and combinations thereof.

6. The photoluminescent formulation of claim 1, wherein said formulation stabilizing additive additionally comprises at least one of a dispersing agent, a wetting agent, or a deaerator/defoamer.

7. The photoluminescent formulation of claim 1, further comprising at least one photostabilizer.

8. The photoluminescent formulation of claim 7, wherein the photostabilizer comprises at least one of one or more hindered amine light stabilizers, one or more hydroxyphenyl triazine UV absorbers, or one or more benzotriazole UV absorbers.

* * * * *